US010687291B2

(12) United States Patent
Montojo et al.

(10) Patent No.: US 10,687,291 B2
(45) Date of Patent: Jun. 16, 2020

(54) CARRIER SHARING BETWEEN MULTIPLE RADIO ACCESS TECHNOLOGIES

(71) Applicant: QUALCOMM Incorporated, San Diego, CA (US)

(72) Inventors: Juan Montojo, San Diego, CA (US); Wanshi Chen, San Diego, CA (US); Peter Gaal, San Diego, CA (US); Valentin Alexandru Gheorghiu, Tokyo (JP); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/140,212

(22) Filed: Sep. 24, 2018

(65) Prior Publication Data

US 2019/0104487 A1 Apr. 4, 2019

Related U.S. Application Data

(60) Provisional application No. 62/567,019, filed on Oct. 2, 2017.

(51) Int. Cl.
*H04B 7/00* (2006.01)
*H04W 56/00* (2009.01)
(Continued)

(52) U.S. Cl.
CPC ....... *H04W 56/001* (2013.01); *H04J 11/0069* (2013.01); *H04W 48/12* (2013.01);
(Continued)

(58) Field of Classification Search
CPC ............. H04W 72/12; H04W 72/1215; H04W 72/1226; H04W 72/1263; H04W 72/1474
(Continued)

(56) References Cited

U.S. PATENT DOCUMENTS 9,445,425 B2* 9/2016 Chapman ............... H04W 16/14
9,661,543 B2* 5/2017 Hole .................... H04W 36/165
(Continued)

FOREIGN PATENT DOCUMENTS

WO WO-2015096821 A1 7/2015

OTHER PUBLICATIONS

Huawei, et al., "Coexistence Between NR and LTE", 3GPP Draft; R1-1611681, 3rd Generation Partnership Project (3GPP), Mobile Competence Centre; 650, Route Des Lucioles; F-06921 Sophia Antipolis Cedex; France, vol. RAN WG1, No. Reno, USA; 20161114-20161118, Nov. 13, 2016 (Nov. 13, 2016), pp. 1-6, XP051175653, Retrieved from the Internet: URL: http://www.3gpp.org/ftp/Meetings_3GPP_SYNC/RAN1/Docs/ [retrieved on Nov. 13, 2016].
(Continued)

*Primary Examiner* — Dmitry Levitan
(74) *Attorney, Agent, or Firm* — Holland & Hart LLP

(57) ABSTRACT

Methods, systems, and devices for wireless communications are described. In some wireless communications systems, a base station may communicate with multiple user equipment (UEs) using multiple radio access technologies (RATs) on a single carrier. As described herein, a base station may transmit an indication that a carrier associated with a first RAT (e.g., Long Term Evolution (LTE)) may support communications using a second RAT (e.g., New Radio (NR)). The base station may transmit the indication in a control channel (e.g., physical broadcast control channel (PBCH)) on the carrier sent along with synchronization signals associated with the first RAT. A UE configured to communicate using the second RAT (e.g., NR) may receive the indication in the control channel and utilize the synchronization signals (e.g., LTE synchronization signals) to synchronize with the base station.

26 Claims, 19 Drawing Sheets

(51) Int. Cl.
*H04J 11/00* (2006.01)
*H04W 72/04* (2009.01)
*H04W 88/10* (2009.01)
*H04W 48/12* (2009.01)
*H04W 48/16* (2009.01)
*H04W 16/14* (2009.01)

(52) U.S. Cl.
CPC ... *H04W 72/0446* (2013.01); *H04W 72/0453* (2013.01); *H04W 88/10* (2013.01); *H04W 16/14* (2013.01); *H04W 48/16* (2013.01); *H04W 72/042* (2013.01)

(58) Field of Classification Search
USPC .................................. 370/310, 328, 329, 350
See application file for complete search history.

(56) References Cited

U.S. PATENT DOCUMENTS

| | | | |
|---|---|---|---|
| 10,039,148 B2* | 7/2018 | Singh | H04W 76/15 |
| 10,142,045 B2* | 11/2018 | Deng | H04L 25/03159 |
| 10,219,200 B2* | 2/2019 | Yoon | H04W 52/0229 |
| 10,313,076 B2* | 6/2019 | Lindoff | H04W 56/001 |
| 10,405,331 B2* | 9/2019 | Xiong | H04W 56/0005 |
| 2009/0325608 A1* | 12/2009 | Cheng | H04W 68/12 |
| | | | 455/458 |
| 2013/0201956 A1* | 8/2013 | Cho | H04W 72/048 |
| | | | 370/329 |
| 2014/0293974 A1 | 10/2014 | Chapman et al. | |
| 2017/0070967 A1* | 3/2017 | Wang | H04W 56/0005 |
| 2018/0091249 A1* | 3/2018 | Han | H04L 27/2613 |
| 2018/0092064 A1* | 3/2018 | Ryu | H04W 48/12 |
| 2018/0249400 A1* | 8/2018 | Harada | H04W 48/18 |
| 2019/0104487 A1* | 4/2019 | Montojo | H04W 56/001 |
| 2019/0261258 A1* | 8/2019 | Lindoff | H04W 36/08 |
| 2019/0274097 A1* | 9/2019 | Hietalahti | H04W 52/0212 |

OTHER PUBLICATIONS

LG Electronics: "Remaining Issues in NR LTE Coexistence", 3GPP Draft; R1-1715904, 3rd Generation Partnership Project (3GPP), Mobile Competence Centre; 650, Route Des Lucioles; F-06921 Sophia Antipolis Cedex; France, vol. RAN WG1, No. Nagoya, Japan; Sep. 18-21, 2017, Sep. 17, 2017 (Sep. 17, 2017), 7 Pages, XP051339363, Retrieved from the Internet: URL: http://www.3gpp.org/ftp/Meetings_3GPP_SYNC/RAN1/Docs/ [retrieved on Sep. 17, 2017].

International Search Report and Written Opinion—PCT/US2018/052585—ISA/EPO—dated Dec. 5, 2018.

* cited by examiner

CARRIER SHARING BETWEEN MULTIPLE RADIO ACCESS TECHNOLOGIES

CROSS REFERENCES

The present Application for patent claims the benefit of U.S. Provisional Patent Application No. 62/567,019 by MONTOJO et al., entitled "CARRIER SHARING BETWEEN MULTIPLE RADIO ACCESS TECHNOLOGIES," filed Oct. 2, 2017, assigned to the assignee hereof, and expressly incorporated by reference herein.

BACKGROUND

The following relates generally to wireless communication and to carrier sharing between multiple radio access technologies (RATs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some wireless communications systems, a base station may utilize a single carrier for communicating with UEs using different RATs. For example, a base station may communicate with a UE on a carrier using LTE, and the base station may communicate with another UE on the same carrier using NR.

SUMMARY

In some wireless communications systems, a base station may communicate with multiple user equipment (UEs) using multiple radio access technologies (RATs) on a single carrier. As described herein, a base station may transmit an indication that a carrier associated with a first RAT (e.g., Long Term Evolution (LTE)) may support communications using a second RAT (e.g., New Radio (NR)). The base station may transmit the indication in a control channel (e.g., physical broadcast control channel (PBCH)) sent on the carrier and along with synchronization signals associated with the first RAT. A UE configured to communicate using the second RAT (e.g., NR) may receive the indication in the control channel and utilize the synchronization signals (e.g., LTE synchronization signals) to synchronize with the base station. Thus, the base station may avoid transmitting synchronization signals associated with the second RAT on the carrier (e.g., NR synchronization signal blocks (SS blocks)), which may result in reduced complexity and overhead in a wireless communications system.

A method for wireless communication at a UE is described. The method may include receiving, from a base station, a control channel associated with a first RAT on resources of a carrier, the control channel indicating that the carrier supports communications using a second RAT, decoding the control channel to determine that the carrier supports communications using the second RAT, and communicating with the base station using the second RAT on resources of the carrier based at least in part on the decoding.

An apparatus for wireless communication at a UE is described. The apparatus may include means for receiving, from a base station, a control channel associated with a first RAT on resources of a carrier, the control channel indicating that the carrier supports communications using a second RAT, means for decoding the control channel to determine that the carrier supports communications using the second RAT, and means for communicating with the base station using the second RAT on resources of the carrier based at least in part on the decoding.

Another apparatus for wireless communication at a UE is described. The apparatus may include a processor, memory in electronic communication with the processor, and instructions stored in the memory. The instructions may be operable to cause the processor to receive, from a base station, a control channel associated with a first RAT on resources of a carrier, the control channel indicating that the carrier supports communications using a second RAT, decode the control channel to determine that the carrier supports communications using the second RAT, and communicate with the base station using the second RAT on resources of the carrier based at least in part on the decoding.

A non-transitory computer-readable medium for wireless communication at a UE is described. The non-transitory computer-readable medium may include instructions operable to cause a processor to receive, from a base station, a control channel associated with a first RAT on resources of a carrier, the control channel indicating that the carrier supports communications using a second RAT, decode the control channel to determine that the carrier supports communications using the second RAT, and communicate with the base station using the second RAT on resources of the carrier based at least in part on the decoding.

In some examples of the method, apparatus, and non-transitory computer-readable medium described herein, decoding the control channel to determine that the carrier supports communications using the second RAT includes identifying one or more bits in the control channel that indicate that the carrier supports communications using the second RAT. In some examples of the method, apparatus, and non-transitory computer-readable medium described herein, the one or more bits comprise reserved bits in the control channel. In some examples of the method, apparatus, and non-transitory computer-readable medium described herein, the control channel may be a PBCH.

Some examples of the method, apparatus, and non-transitory computer-readable medium described herein may further include processes, features, means, or instructions for receiving synchronization signals associated with the first RAT. Some examples of the method, apparatus, and non-transitory computer-readable medium described herein may further include processes, features, means, or instructions for synchronizing with the base station using the synchronization signals. In some examples of the method, apparatus, and non-transitory computer-readable medium described herein, the synchronization signals include primary synchronization signals (PSSs) and secondary synchronization signals (SSSs).

Some examples of the method, apparatus, and non-transitory computer-readable medium described herein may further include processes, features, means, or instructions for communicating with the base station using the second RAT on resources of the carrier being further based at least in part on the synchronizing with the base station using the synchronization signals.

Some examples of the method, apparatus, and non-transitory computer-readable medium described herein may further include processes, features, means, or instructions for determining a location of a data channel including remaining minimum system information (RMSI) for the UE based at least in part on the control channel. In some examples of the method, apparatus, and non-transitory computer-readable medium described herein, determining the location of the data channel includes identifying a location of a control resource set (coreset) including control information for the UE based at least in part on one or more bits in the control channel, and determining the location of the data channel including the RMSI for the UE based at least in part on the control information in the coreset. In some examples of the method, apparatus, and non-transitory computer-readable medium described herein, the one or more bits comprise reserved bits in the control channel.

In some examples of the method, apparatus, and non-transitory computer-readable medium described herein, the first RAT may be associated with communications during transmission time intervals (TTIs) having a first duration, and the second RAT may be associated with communications during TTIs having a second duration. In some examples of the method, apparatus, and non-transitory computer-readable medium described herein, the first RAT may be associated with an LTE network and the second RAT may be associated with an NR network.

A method for wireless communication at a base station is described. The method may include identifying a carrier that supports communications using a first RAT and a second RAT, transmitting, to one or more UEs, a control channel associated with the first RAT that indicates that the carrier supports communications using the second RAT, and communicating with the one or more UEs using the second RAT on resources of the carrier based at least in part on the indication in the control channel that the carrier supports communications using the second RAT.

An apparatus for wireless communication at a base station is described. The apparatus may include means for identifying a carrier that supports communications using a first RAT and a second RAT, means for transmitting, to one or more UEs, a control channel associated with the first RAT that indicates that the carrier supports communications using the second RAT, and means for communicating with the one or more UEs using the second RAT on resources of the carrier based at least in part on the indication in the control channel that the carrier supports communications using the second RAT.

Another apparatus for wireless communication at a base station is described. The apparatus may include a processor, memory in electronic communication with the processor, and instructions stored in the memory. The instructions may be operable to cause the processor to identify a carrier that supports communications using a first RAT and a second RAT, transmit, to one or more UEs, a control channel associated with the first RAT that indicates that the carrier supports communications using the second RAT, and communicate with the one or more UEs using the second RAT on resources of the carrier based at least in part on the indication in the control channel that the carrier supports communications using the second RAT.

A non-transitory computer-readable medium for wireless communication at a base station is described. The non-transitory computer-readable medium may include instructions operable to cause a processor to identify a carrier that supports communications using a first RAT and a second RAT, transmit, to one or more UEs, a control channel associated with the first RAT that indicates that the carrier supports communications using the second RAT, and communicate with the one or more UEs using the second RAT on resources of the carrier based at least in part on the indication in the control channel that the carrier supports communications using the second RAT.

In some examples of the method, apparatus, and non-transitory computer-readable medium described herein, identifying that the carrier supports communications using the first RAT and the second RAT includes identifying that the control channel may be in a frequency band in which the first RAT and the second RAT coexist. In some examples of the method, apparatus, and non-transitory computer-readable medium described herein, the indication in the control channel that the carrier supports communications using the second RAT may be included in one or more bits in the control channel. In some examples of the method, apparatus, and non-transitory computer-readable medium described herein, the one or more bits comprise reserved bits in the control channel. In some examples of the method, apparatus, and non-transitory computer-readable medium described herein, the control channel may be a PBCH.

Some examples of the method, apparatus, and non-transitory computer-readable medium described herein may further include processes, features, means, or instructions for transmitting, to the one or more UEs, synchronization signals associated with the first RAT, where the synchronization signals include information for synchronizing with the base station. In some examples of the method, apparatus, and non-transitory computer-readable medium described herein, the synchronization signals include PSSs and SSSs.

Some examples of the method, apparatus, and non-transitory computer-readable medium described herein may further include processes, features, means, or instructions for transmitting, in the control channel, an indication of a location of a data channel including RMSI for the one or more UEs. In some examples of the method, apparatus, and non-transitory computer-readable medium described herein, transmitting the indication of the location of the data channel includes transmitting one or more bits in the control channel that indicate a location of a coreset including control information for the one or more UEs, where the control information indicates the location of the data channel including the RMSI for the one or more UEs. In some examples of the method, apparatus, and non-transitory computer-readable medium described herein, the one or more bits comprise reserved bits in the control channel.

In some examples of the method, apparatus, and non-transitory computer-readable medium described herein, the first RAT may be associated with communications during TTIs having a first duration, and the second RAT may be associated with communications during TTIs having a second duration. In some examples of the method, apparatus, and non-transitory computer-readable medium described herein, the first RAT may be associated with an LTE network and the second RAT may be associated with an NR network.

DETAILED DESCRIPTION

In some wireless communications systems, a base station may communicate with multiple user equipment (UEs) using multiple radio access technologies (RATs) on resources of a single carrier. Before communicating with the base station, each UE may synchronize with the base station using synchronization signals received from the base station. In some cases, the synchronization signals transmitted to a UE configured to communicate using one RAT may be different from the synchronization signals transmitted to a UE configured to communicate using another RAT. Accordingly, to allow UEs associated with different RATs to synchronize with a base station for communications on a single carrier, it may be appropriate for the base station to transmit synchronization signals associated with each RAT on the carrier. However, the transmission of synchronization signals associated with multiple RATs on a carrier may result in increased overhead in a wireless communications system. Further, it may be challenging for the base station to transmit synchronization signals associated with each RAT on the carrier (e.g., the synchronization signals associated with some RATs may span a wider bandwidth than the carrier).

As described herein, a base station may support efficient techniques for providing synchronization signals to UEs configured to communicate using different RATs on a single carrier. For example, a base station may identify that a certain carrier (e.g., a low frequency carrier) configured for communications using a first RAT (e.g., Long Term Evolution (LTE)) also supports communications using a second RAT (e.g., New Radio (NR)). Using the techniques described herein, the base station may transmit an indication to one or more UEs that the carrier supports communications using the second RAT. The base station may transmit the indication in a control channel (e.g., a physical broadcast control channel (PBCH)) on the carrier sent along with synchronization signals associated with the first RAT (e.g., LTE synchronization signals). A UE configured to communicate using the second RAT (e.g., NR) may receive the indication and use the synchronization signals associated with the first RAT to synchronize with the base station for communications using the second RAT.

Aspects of the disclosure introduced above are described herein in the context of a wireless communications system. Examples of processes and signaling exchanges that support carrier sharing between multiple RATs are then described. Aspects of the disclosure are further illustrated by and described with reference to apparatus diagrams, system diagrams, and flowcharts that relate to carrier sharing between multiple RATs.

Figure 1:
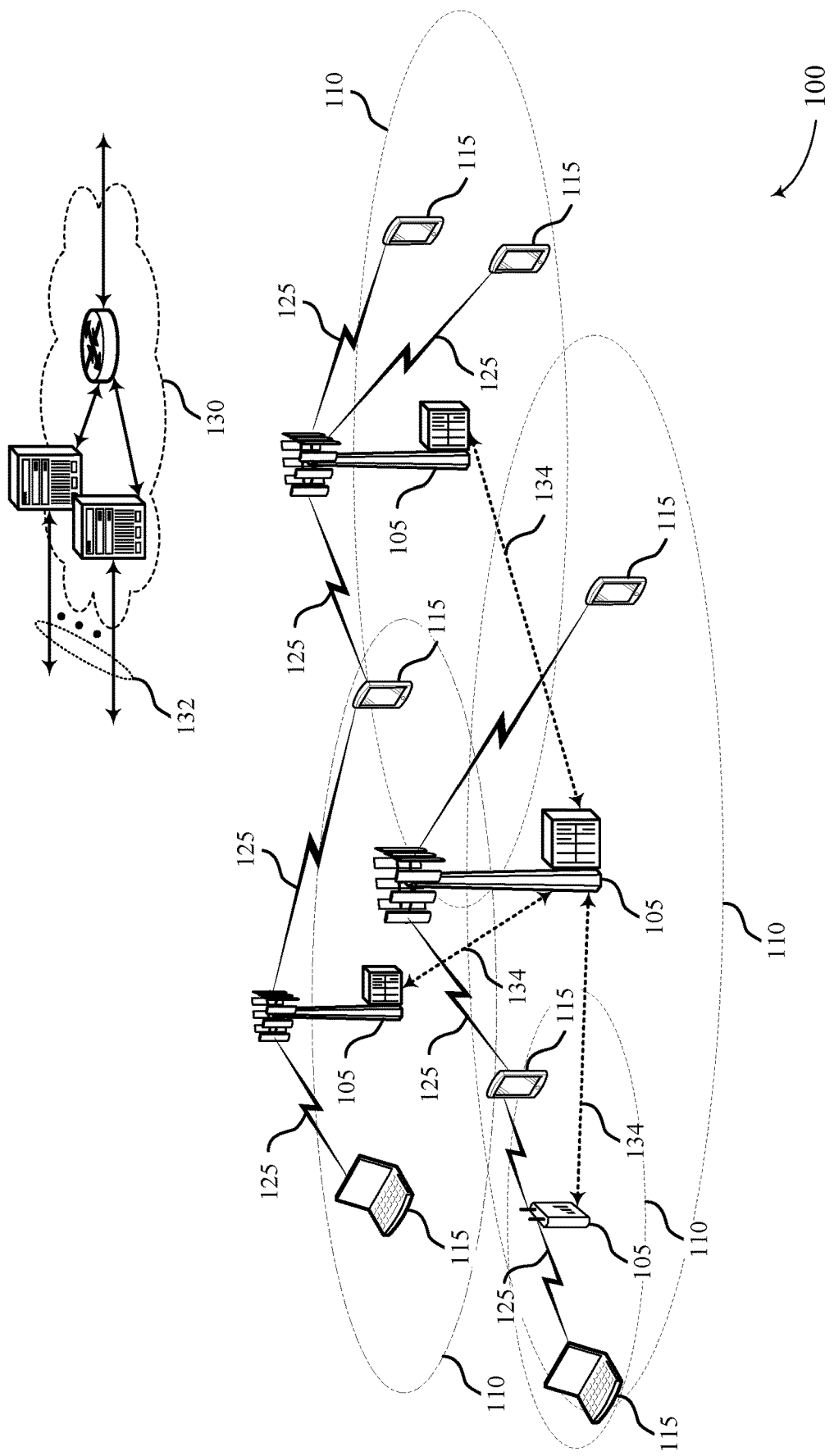
FIG. 1 illustrates an example of a wireless communications system that supports carrier sharing between multiple radio access technologies (RATs) in accordance with various aspects of the present disclosure.

FIG. 1 illustrates an example of a wireless communications system 100 that supports carrier sharing between multiple RATs in accordance with various aspects of the present disclosure. The wireless communications system 100 includes base stations 105, UEs 115, and a core network 130. In some examples, the wireless communications system 100 may be an LTE network, an LTE-Advanced (LTE-A) network, or an NR network. In other examples, wireless communications system 100 may include multiple networks, such as an LTE network, an LTE-A network, and/or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Time intervals in LTE or NR may be expressed in multiples of a basic time unit, which may, for example, refer to a sampling period of $T_s=1/30$, 720,000 seconds. Time intervals of a communications resource may be organized according to radio frames each having a duration of 10 milliseconds (ms), where the frame period may be expressed as $T_f=307,200\ T_s$. The radio frames may be identified by a system frame number ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe (e.g., a slot or two symbols) or may be dynamically selected (e.g., in bursts of shortened TTIs (sTTIs) or in selected component carriers using sTTIs).

Wireless communications system 100 may operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than ultra-high frequency (UHF) antennas. In some cases, this may facilitate use of antenna arrays within a UE 115. However, the propagation of EHF transmissions may be subject to even greater atmospheric attenuation and shorter range than super high frequency (SHF) or UHF transmissions. Techniques disclosed herein may be employed across transmissions that use one or more different frequency regions, and designated use of bands across these frequency regions may differ by country or regulating body.

In wireless communications system 100, UEs 115 may synchronize with a base station 105 prior to communicating with the base station 105. Synchronization (e.g., for cell acquisition) may be performed using synchronization signals or channels transmitted by a base station 105. A base station 105 may transmit synchronization signals (e.g., primary synchronization signals (PSSs) and secondary synchronization signals (SSSs)) containing discovery reference signals. A base station 105 may also transmit system information in a control channel (e.g., a PBCH) that indicates additional parameters for communicating with the base station 105. A UE 115 may receive the synchronization signals and system information and attempt to synchronize with a base station 105 for communications with the base station 105.

In an example, a UE 115 attempting to access a wireless network (e.g., an LTE or NR network) may perform an initial cell search by detecting a PSS from the base station 105. The PSS may enable synchronization of slot timing and may indicate a physical layer identity value. The UE 115 may then receive an SSS. The SSS may enable radio frame synchronization, and may provide a cell ID value, which may be combined with the physical layer identity value to form the physical cell identifier (PCID), which identifies the cell. The SSS may also enable detection of a duplexing mode and a cyclic prefix (CP) length. An SSS may be used to acquire other system information (e.g., bandwidth, subframe index). The PBCH may be used to acquire additional system information to be used for acquisition (e.g., bandwidth, radio frame index/number, etc.). For example, the PBCH may carry a master information block (MIB) and one or more system information blocks (SIBs) for a given cell.

Figure 2:
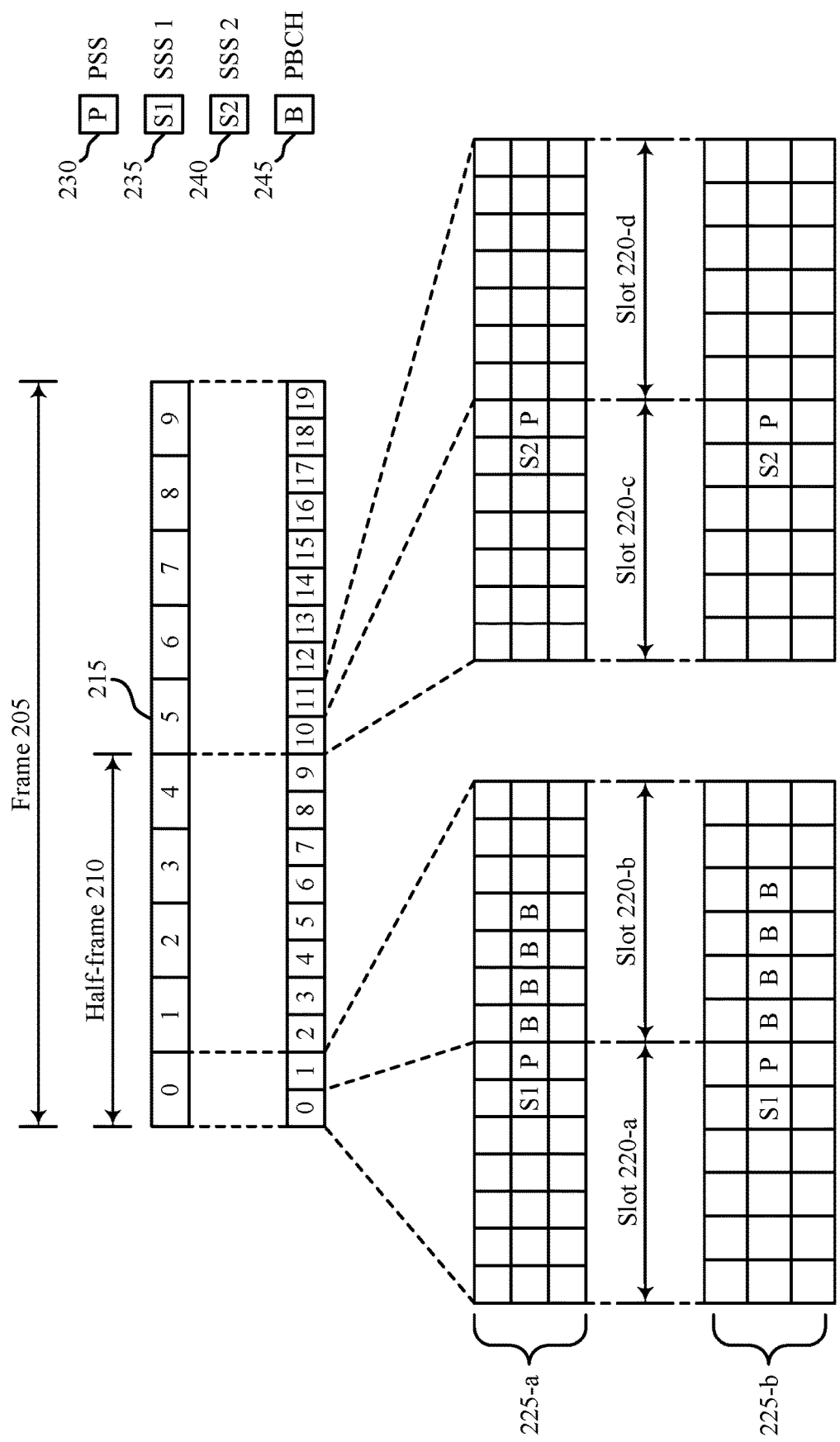
FIG. 2 illustrates an example transmission of synchronization signals and system information in accordance with various aspects of the present disclosure.

In some cases, the synchronization signals and system information used for synchronizing with a base station 105 may be transmitted differently in different wireless networks. FIG. 2 illustrates an example transmission of synchronization signals and system information in LTE networks. In this example, a base station may transmit (or broadcast) synchronization signals and system information in a frame 205 to one or more UEs 115. The frame 205 may contain two half-frames 210, each including five subframes 215. Each of the subframes 215 may include two slots each containing seven modulation symbols (e.g., for a normal cyclic prefix prepended to each symbol period as shown in resource set 225-*a*) or six modulation symbol periods (e.g., for an extended cyclic prefix prepended to each symbol period as shown in resource set 225-*b*).

A base station 105 may transmit a PSS 230, SSS 1 235, and system information in a PBCH 245 in a first subframe 215 of the first half-frame 210 (e.g., subframe 0), and the base station 105 may transmit a PSS 230 and an SSS 2 240 in a first subframe 215 of the second half-frame 210 (e.g., subframe 5). The synchronization signals and system information transmitted in the subframes 215 (e.g., subframe 0 and subframe 5) may span 6 resource blocks. Once a UE 115 receives the synchronization signals and system information from the base station 105, the UE 115 may use the synchronization signals and system information to synchronize with the base station 105 for communications with the base station 105.

Figure 3:
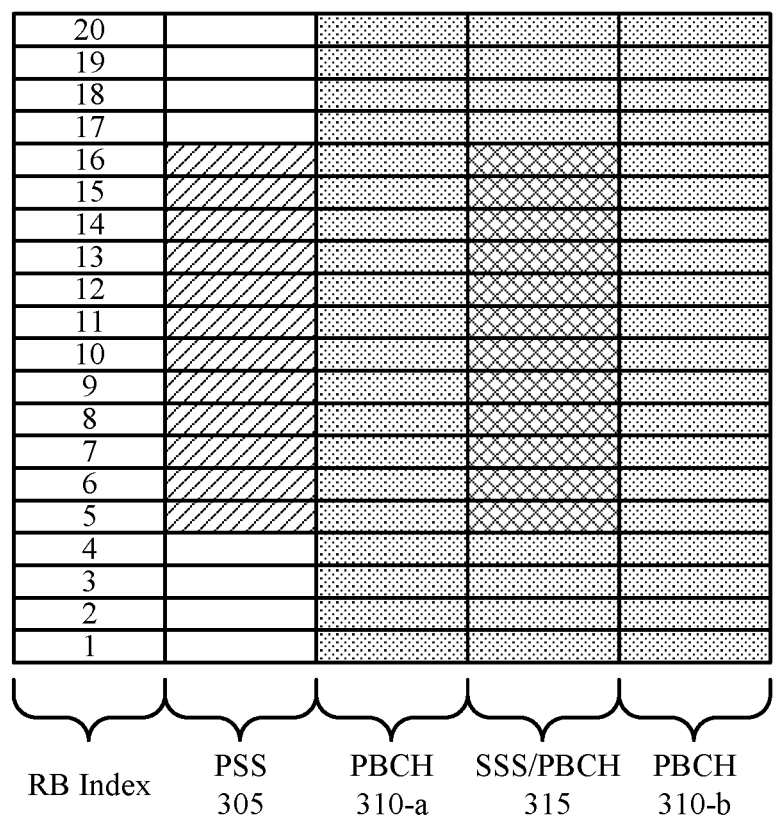
FIG. 3 illustrates an example of a synchronization signal (SS) block in accordance with various aspects of the present disclosure.

In other wireless networks (e.g., NR networks), the synchronization signals and system information may be transmitted using techniques different from those described with reference to FIG. 2. FIG. 3 illustrates an example transmission of synchronization signals and system information in NR networks (e.g., 5G networks). Specifically, in an NR network, a base station 105 may transmit a synchronization signal block (SS block) 300 that contains synchronization signals and system information for a UE 115. For instance, the SS block 300 may include a PSS 305 (e.g., one PSS symbol), an SSS/PBCH 315 (e.g., including one SSS symbol corresponding to resource blocks 5 to 16 and PBCH corresponding to resource blocks 1 to 4 and 17 to 20), and PBCH 310 (e.g., two PBCH symbols). The signals included in an SS block 300 may be time division multiplexed, such as a time division multiplexed PSS 305, first PBCH 310-*a*, SSS/PBCH 315, and second PBCH 310-*b* (transmitted in the indicated order as shown), or a time division multiplexed first PBCH, PSS, SSS/PBCH, and second PBCH (transmitted in the indicated order (not shown)), etc.

Figure 4:
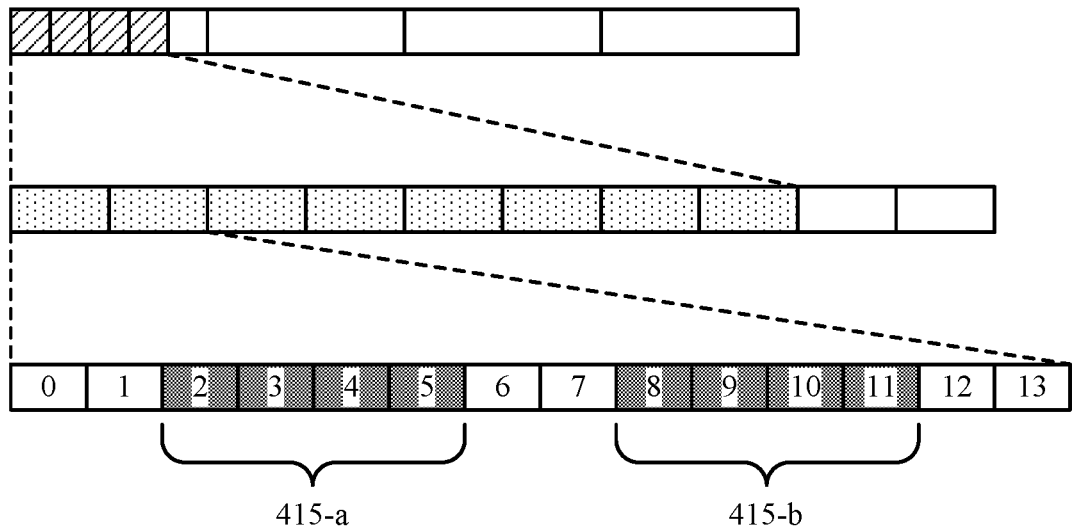
FIGS. 4 and 5 illustrate examples of resources used to transmit one or more SS blocks in accordance with various aspects of the present disclosure.
Figure 5:
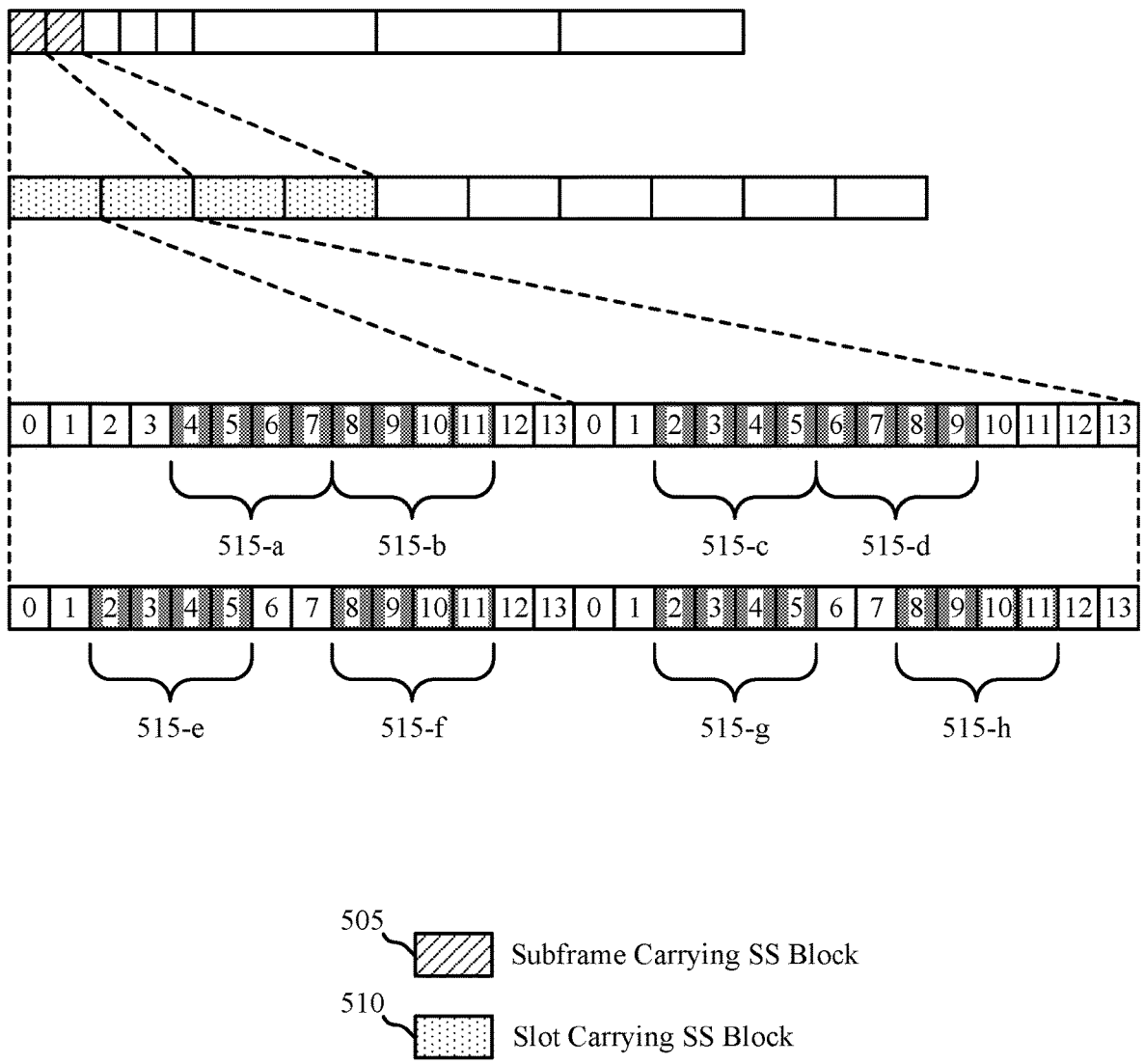

Thus, control information in a PBCH may be transmitted in a subset of SS block time resources (e.g., in two symbols of an SS block) and a subset of frequency resources (e.g., in a subset of resource blocks of a symbol), and synchronization signals (e.g., PSS and SSS) may be transmitted in another subset of SS block 300 time resources and SS block 300 frequency resources. A base station 105 may transmit SS blocks (e.g., SS block 300) in different groups of symbols (e.g., groups of 4 symbols) depending on the numerology of the resources used to transmit the SS block. In the example of FIG. 4, a base station 105 may transmit one or more SS blocks on a set of resources 415 having a subcarrier spacing of 15 kHz. The resources used for the transmission of the SS blocks may be within certain slots 410 of certain subframes 405 within a frame, and the SS block may span twenty (20) resource blocks (as shown in FIG. 3). Alternatively, in the example of FIG. 5, a base station 105 may transmit one or more SS blocks on a set of resources 515 having a subcarrier spacing of 30 kHz. Similar to the example of FIG. 4, the resources used for the transmission of the SS blocks may be within certain slots 510 of certain subframes 505 within a frame, and the SS block may also span twenty (20) resource blocks (as shown in FIG. 3).

Thus, in accordance with the techniques described herein, a UE 115 configured to communicate using a certain RAT (e.g., LTE or NR) may synchronize with a base station 105 using synchronization signals associated with the respective RAT. For example, a UE 115 configured to communicate with a base station 105 using LTE may synchronize with the base station 105 using synchronization signals described with reference to FIG. 2. Alternatively, a UE 115 configured to communicate with a base station 105 using NR may synchronize with the base station 105 using synchronization signals described with reference to FIGS. 3-5. In these examples, a base station 105 may communicate with some UEs 115 using LTE on certain carriers, and the base station 105 may communicate with other UEs using NR on other carriers. Accordingly, the base station may transmit synchronization signals using the techniques described with reference to FIG. 2 on carriers used for communications with UEs 115 using LTE, and the base station 105 may transmit synchronization signals using the techniques described with reference to FIGS. 3-5 on carriers used for communications with UEs 115 using NR.

In some cases, however, a base station 105 may identify a carrier (e.g., a low frequency carrier) to be used for communications with UEs 115 using multiple RATs. For example, the base station 105 may be configured to use an LTE carrier for NR communications with certain UEs configured to communicate using NR (e.g., using shortened TTIs, low latency communications, etc.). In such cases, it may be appropriate for the base station 105 to provide synchronization signals on the carrier to UEs configured to communicate using LTE and to UEs configured to communicate using NR. However, because the different RATs may typically be associated with different synchronization signaling, it may be challenging for the base station 105 to provide synchronization signals associated with each of the different RATs.

For example, a base station 105 may not have access to sufficient resources to transmit synchronization signals for LTE UEs and synchronization signals for NR UEs in a subframe. As discussed above, to facilitate synchronization for NR communications, the base station 105 may transmit an SS block 300 spanning 4 symbols to NR UEs. However, the base station 105 may not have access to 4 symbols to transmit the SS block to NR UEs. For example, as illustrated in FIG. 2, the base station 105 may transmit LTE synchronization signals and system information in subframe 0 of a frame. In this example, the base station 105 may have access to 3 symbols in subframe 0 before the symbols used to transmit the LTE synchronization signals and system information (e.g., since the first two symbols may be used for control signaling). And the base station 105 may have access to 3 symbols in subframe 0 after the symbols used to transmit the LTE synchronization signals and system information. Thus, the base station 105 may not have access to sufficient resources (e.g., 4 symbols) to transmit the SS block to NR UEs.

In one example, to fit the SS block in 3 symbols associated with a subcarrier spacing of 15 kHz, the base station 105 may transmit the SS block in subframe 0 with a subcarrier spacing of 30 kHz. Thus, the base station 105 may be able to transmit the SS block in four symbols with a reduced duration (e.g., two symbols with a subcarrier spacing of 15 kHz) over a wider frequency band. However, the carrier to be used for communications with the base station 105 (e.g., the LTE carrier) may not span a wide enough bandwidth to support the transmission of an SS block over a wider frequency band with a subcarrier spacing of 30 kHz. For example, the SS block may span a frequency band greater than 8 MHz if the SS block is transmitted with a subcarrier spacing of 30 MHz, and the carrier may span a frequency band less than 8 MHz (e.g., the carrier may have a minimum bandwidth of 5 MHz). Therefore, the base station 105 may not be able to transmit an SS block to NR UEs in a subframe that is used to transmit LTE synchronization signals and system information.

As an alternative, the base station 105 may transmit the SS block in a subframe allocated for broadcast data (e.g., a multicast-broadcast single-frequency network (MBSFN) subframe). In some wireless communications systems, however, certain UEs 115 may not support communications using an MBSFN subframe (i.e., the UEs 115 may not be capable of communicating using an MBSFN subframe). Thus, based on the examples described herein, it may be challenging for a base station 105 to transmit synchronization signals and system information for UEs 115 configured to communicate using different RATs on a same carrier. Wireless communications system 100 may support efficient techniques for providing synchronization signals and system information to UEs 115 configured to communicate using different RATs on a same carrier.

Figure 6:
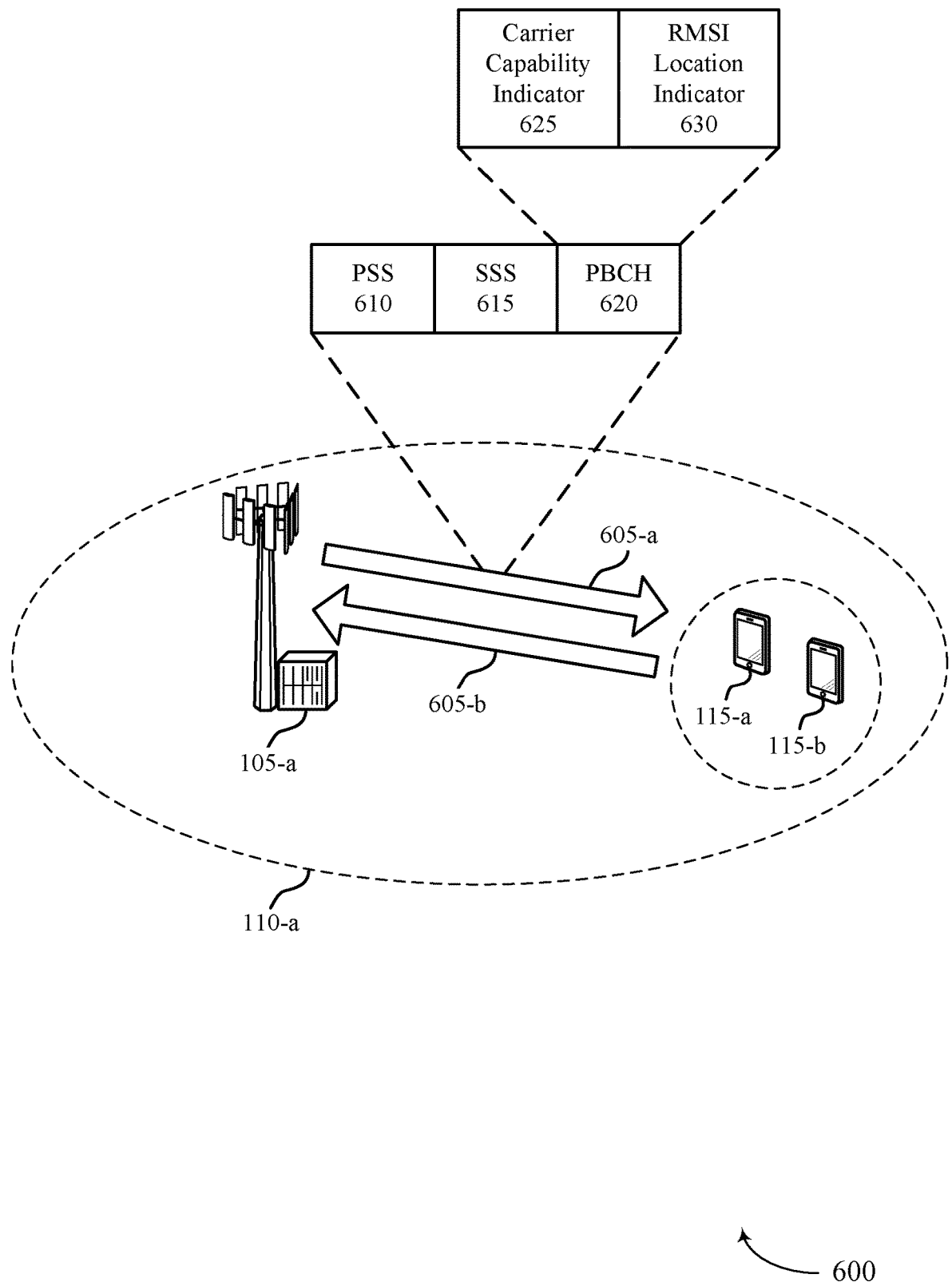
FIG. 6 illustrates an example of a wireless communications system that supports carrier sharing between multiple RATs in accordance with various aspects of the present disclosure.

FIG. 6 illustrates an example of a wireless communications system 600 that supports carrier sharing between multiple RATs in accordance with various aspects of the present disclosure. Wireless communications system 600 includes base station 105-a and UE 115-a, which may be examples of the corresponding devices described with reference to FIG. 1. Base station 105-a may communicate with UEs 115 (including UE 115-a and UE 115-b) within coverage area 110-a. For example, base station 105-a may communicate with UE 115-a and UE 115-b on resources of a carrier 605. UE 115-a may be configured to communicate with base station 105-a using a first RAT (e.g., LTE) on carrier 605, and UE 115-b may be configured to communicate with base station 105-b using a second RAT (e.g., NR) on carrier 605.

In the example of FIG. 6, base station 105-a may identify that carrier 605 supports communications using multiple RATs (e.g., LTE and NR). For example, base station 105-a may determine that carrier 605 spans a frequency band in which multiple RATs coexist. Thus, base station 105-a may utilize carrier 605 for communicating with UE 115-a using a first RAT (e.g., LTE) and UE 115-b using a second RAT (e.g., NR). As described herein, in order to ensure that UE 115-a and UE 115-b are able to synchronize with base station 105-a for communications with base station 105-a on carrier 605, base station 105-a may support efficient techniques for providing synchronization signals (e.g., PSS 610 and SSS 615) and system information (e.g., in PBCH 620) to UE 115-a and UE 115-b.

In particular, base station 105-a may transmit synchronization signals and system information associated with the first RAT (e.g., as described with reference to FIG. 2) to UE 115-a and UE 115-b. UE 115-a may receive the synchronization signals and system information and synchronize with base station 105-a for communications on carrier 605 using the first RAT. UE 115-b may receive the synchronization signals and system information and determine whether to synchronize with base station 105-a for communications on carrier 605 based on whether carrier 605 supports communications using the second RAT. That is, UE 115-b may synchronize with base station 105-a for communications on carrier 605 using the second RAT if the carrier 605 supports communications using the second RAT.

In some cases, UE 115-b may determine whether carrier 605 supports communications using the second RAT based on control information received in the PBCH 620. Specifically, base station 105-a may transmit a carrier capability indicator 625 in PBCH 620 that indicates whether carrier 605 supports communications using the second RAT. The carrier capability indicator 625 may be transmitted in one or more bits reserved in the PBCH 620 (e.g., one or more bits reserved for providing system information to MTC or NB-IoT UEs). In this example, UE 115-b may decode the PBCH 620 to determine that carrier 605 supports communications using the second RAT. Accordingly, UE 115-b may synchronize with base station 105-b using the synchronization signals associated with the first RAT for communications with base station 105-b on carrier 605 using the second RAT. UE 115-b may also use the system information in PBCH 620 to determine appropriate parameters for communicating with base station 105-a.

In addition, base station 105-a may transmit remaining minimum system information (RMSI) in a data channel to UE 115-b. The RMSI may contain additional parameters for communicating with base station 105-a. Accordingly, in order to allow UE 115-b to identify the location of the data channel that includes the RMSI, base station 105-a may transmit an RMSI location indicator 630 in the PBCH 620 (e.g., using the reserved bits described herein) that identifies the location of the data channel that includes the RMSI. In some cases, the RMSI location indicator 630 may indicate the location of a control resource set (coreset) that includes control information for UE 115-b, and the control information in the coreset may indicate the location of the data channel that includes the RMSI for UE 115-b. Thus, UE 115-b may identify the location of the coreset, decode the control information in the coreset, and identify the location of the data channel that includes the RMSI for UE 115-b.

Figure 7:
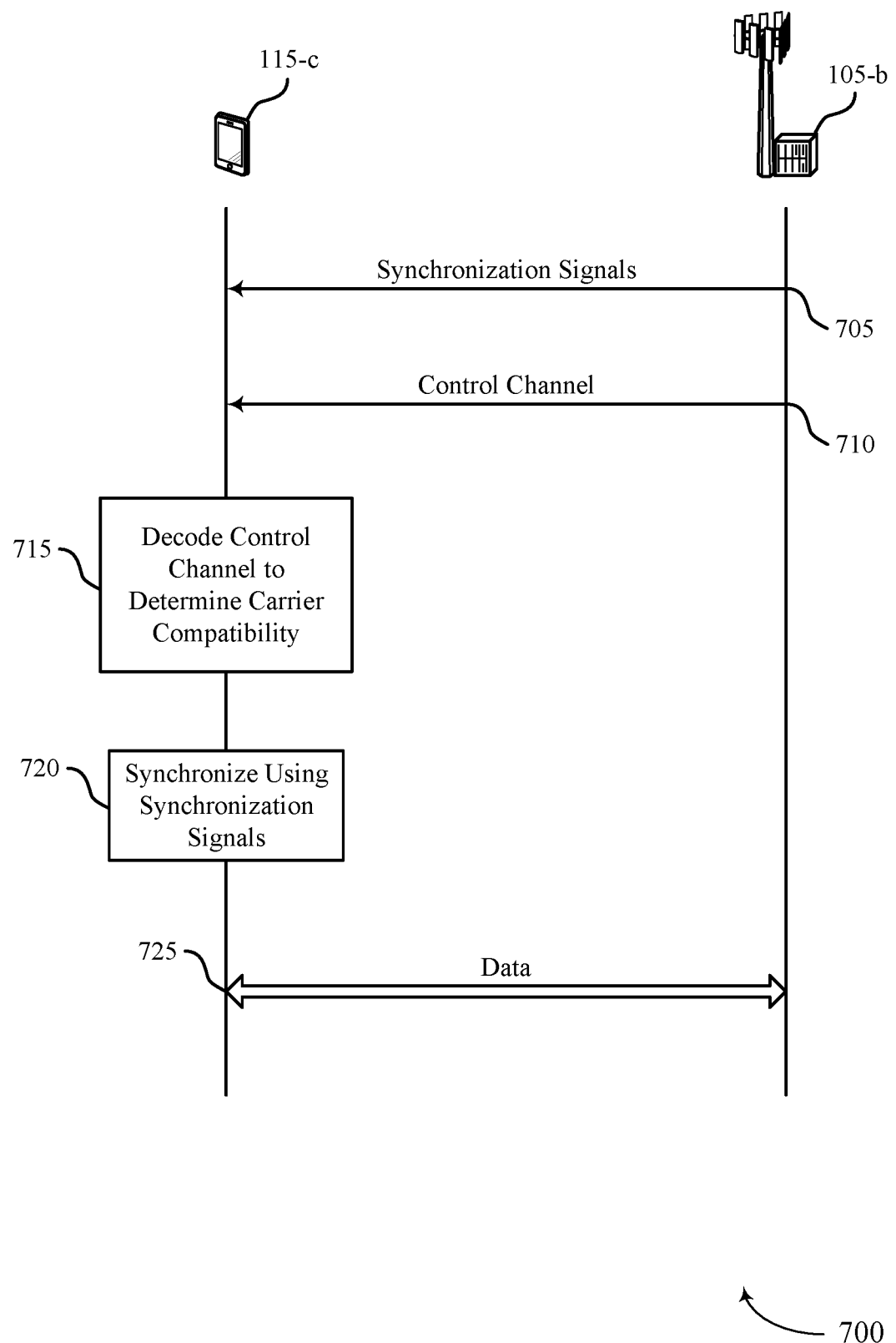
FIG. 7 illustrates an example of a process flow that supports carrier sharing between multiple RATs in accordance with various aspects of the present disclosure.

FIG. 7 illustrates an example of a process flow 700 that supports carrier sharing between multiple RATs in accordance with various aspects of the present disclosure. Process flow 700 illustrates aspects of techniques performed by base station 105-b, which may be an example of a base station 105 described with reference to FIGS. 1-6. Process flow 700 also illustrates aspects of techniques performed by UE 115-c, which may be an example of a UE 115 described with reference to FIGS. 1-6.

At 705, base station 105-b may transmit (or broadcast) synchronization signals associated with a first RAT (e.g., LTE) to one or more UEs (e.g., including UE 115-c). The synchronization signals (e.g., PSSs and SSSs) may include information for synchronizing with base station 105-b. UE 115-c (e.g., a UE configured to communicate using a second RAT (e.g., NR)) may receive the synchronization signals and determine whether to synchronize with base station 105-b using the synchronization signals. For example, if UE 115-c determines that the carrier on which the synchronization signals were received is capable of supporting communications using the second RAT, UE 115-c may synchronize with base station 105-b using the synchronization signals associated with the first RAT. Otherwise, UE 115-c may refrain from synchronizing with base station 105-b using the synchronization signals associated with the first RAT.

At 710, UE 115-c may receive control information in a control channel (e.g., a PBCH transmitted along with the synchronization signals received at 705), and the control information may indicate whether the carrier supports communications using the second RAT. In the example of FIG. 7, at 715, UE 115-c may decode the control information in the control channel to determine that the carrier supports communications using the second RAT. For example, UE 115-c may identify one or more bits (e.g., reserved bits) in the control channel that indicate that the carrier supports communications using the second RAT. Accordingly, at 720, UE 115-c may synchronize with base station 105-b using the synchronization signals associated with the first RAT (e.g., LTE synchronization signals) received at 705.

In some cases, base station 105-b may also transmit RMSI to UE 115-c. In such cases, base station 105-b may transmit an indication of a location of a data channel including the RMSI for the UE 115-c to UE 115-c in the control channel at 710. For example, base station 105-b may transmit one or more bits (e.g., reserved bits) in the control channel that indicate a location of a coreset that includes control information for UE 115-c, and the control information in the corset may indicate the location of the data channel including the RMSI for UE 115-c. Accordingly, UE 115-c may identify the location of the data channel based on the PBCH, and UE 115-c may decode the RMSI to identify the additional system information including additional parameters for communicating with base station 105-b. At 725, UE 115-c may then communicate with base station 105-b using the second RAT based on synchronizing with base station 105-b and based on decoding the RMSI.

Figure 8:
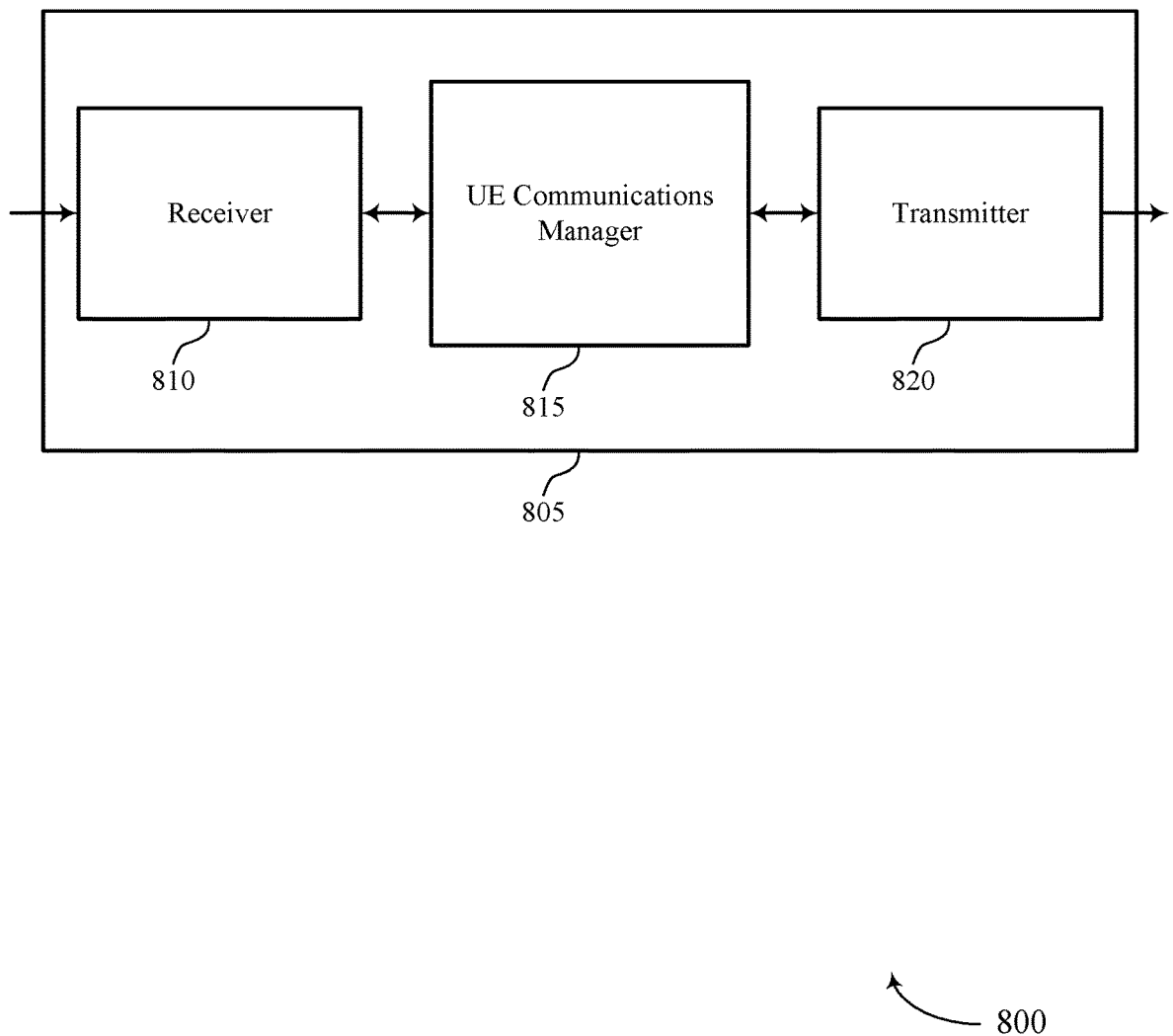
FIGS. 8-10 show block diagrams of a device that supports carrier sharing between multiple RATs in accordance with various aspects of the present disclosure.

FIG. 8 shows a block diagram 800 of a wireless device 805 that supports carrier sharing between multiple RATs in accordance with various aspects of the present disclosure. Wireless device 805 may be an example of aspects of a UE 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to carrier sharing between multiple RATs, etc.). Information may be passed on to other components of the device. The receiver 810 may be an example of aspects of the transceiver 1135 described with reference to FIG. 11. The receiver 810 may utilize a single antenna or a set of antennas.

UE communications manager 815 may be an example of aspects of the UE communications manager 1115 described with reference to FIG. 11. UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 815 may receive, from a base station, a control channel associated with a first RAT on resources of a carrier, the control channel indicating that the carrier supports communications using a second RAT and decode the control channel to determine that the carrier supports communications using the second RAT. UE communications manager 815 may then coordinate with receiver 810 and transmitter 820 to communicate with the base station using the second RAT on resources of the carrier based on the decoding.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
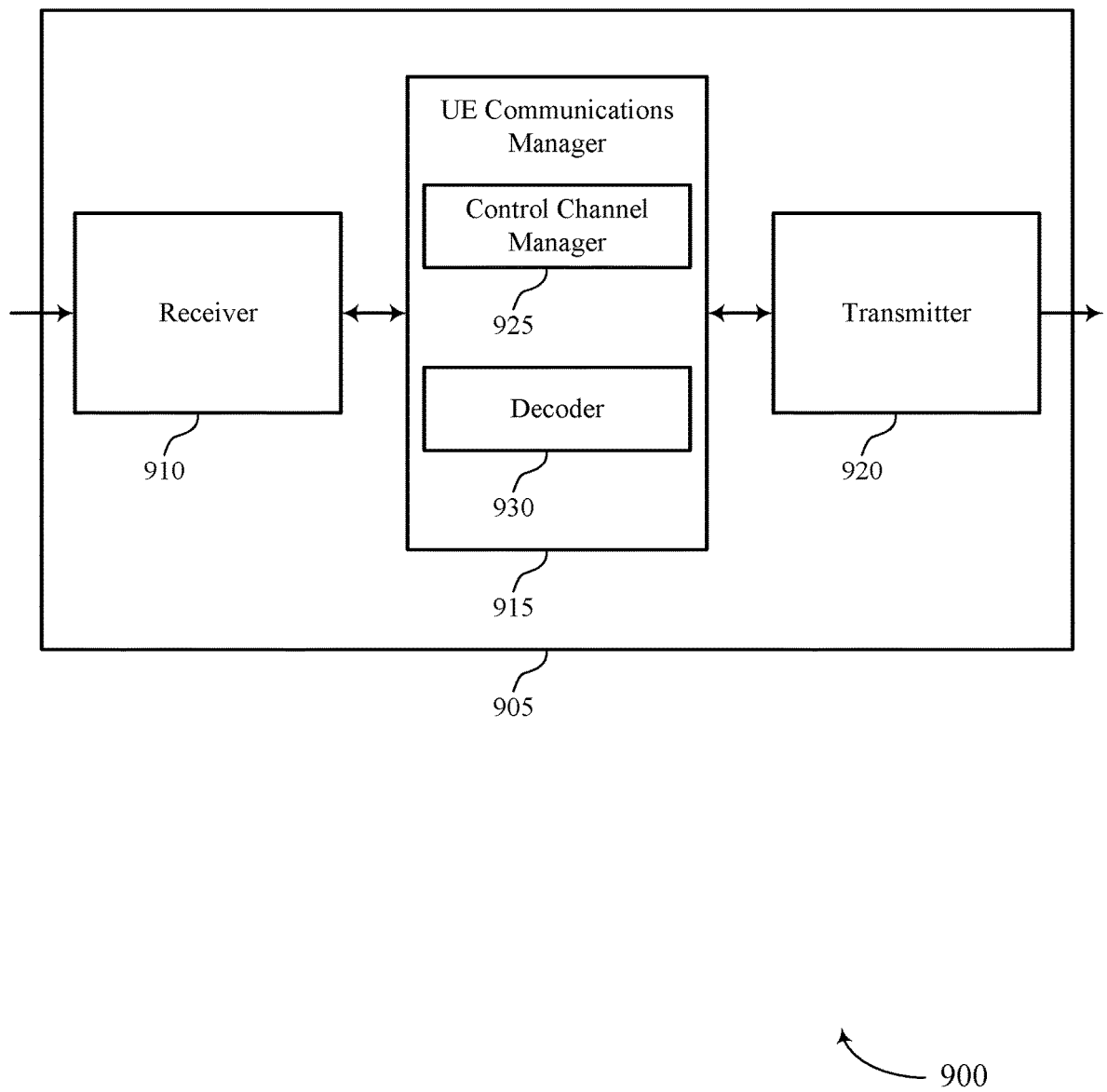

FIG. 9 shows a block diagram 900 of a wireless device 905 that supports carrier sharing between multiple RATs in accordance with various aspects of the present disclosure. Wireless device 905 may be an example of aspects of a wireless device 805 or a UE 115 as described with reference to FIG. 8. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to carrier sharing between multiple RATs, etc.). Information may be passed on to other components of the device. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11. UE communications manager 915 may include control channel manager 925 and decoder 930. Control channel manager 925 may receive, from a base station, a control channel associated with a first RAT on resources of a carrier, the control channel indicating that the carrier supports communications using a second RAT. In some cases, the control channel is a PBCH.

Decoder 930 may then decode the control channel to determine that the carrier supports communications using the second RAT. In some cases, decoder 930 may identify one or more bits in the control channel that indicate that the carrier supports communications using the second RAT. In some cases, the one or more bits comprise reserved bits in the control channel. In some cases, the first RAT is associated with communications during TTIs having a first duration, and the second RAT is associated with communications during TTIs having a second duration. In some cases, the first RAT is associated with an LTE network and the second RAT is associated with an NR network. UE communications manager 915 may then coordinate with receiver 910 and transmitter 920 to communicate with the base station using the second RAT on resources of the carrier based on the decoding.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
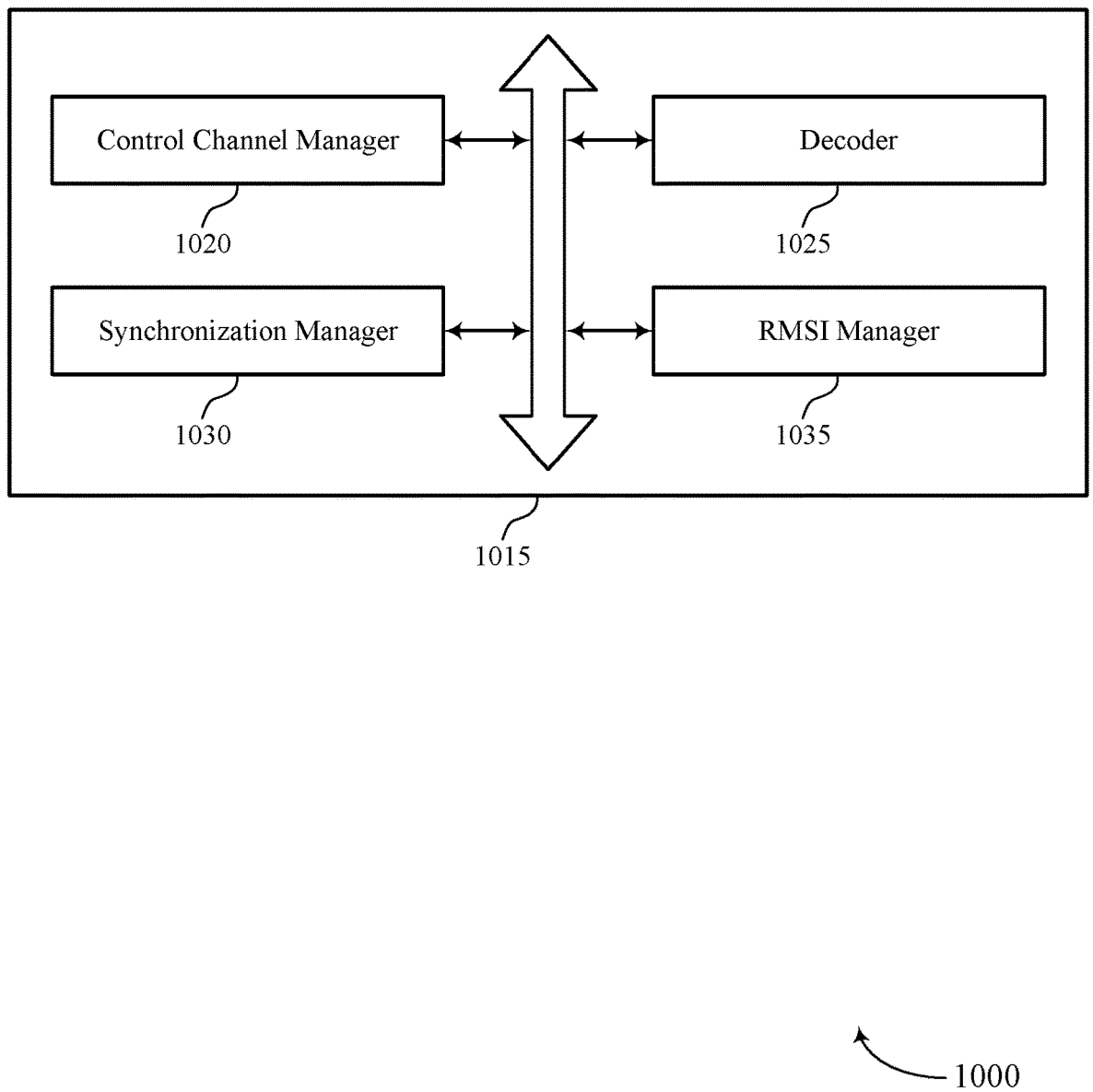

FIG. 10 shows a block diagram 1000 of a UE communications manager 1015 that supports carrier sharing between multiple RATs in accordance with various aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include control channel manager 1020, decoder 1025, synchronization manager 1030, and RMSI manager 1035. Each of these modules may communicate, directly or indirectly, with one another (e.g., via one or more buses).

Control channel manager 1020 may receive, from a base station, a control channel associated with a first RAT on resources of a carrier, where the control channel indicates that the carrier supports communications using a second RAT. In some cases, the control channel is a PBCH. Decoder 1025 may decode the control channel to determine that the carrier supports communications using the second RAT. In some cases, decoding the control channel to determine that the carrier supports communications using the second RAT includes identifying one or more bits in the control channel that indicate that the carrier supports communications using the second RAT. In some cases, the one or more bits comprise reserved bits in the control channel. In some cases, the first RAT is associated with communications during TTIs having a first duration, and the second RAT is associated with communications during TTIs having a second duration. In some cases, the first RAT is associated with an LTE network and the second RAT is associated with an NR network.

Synchronization manager 1030 may receive synchronization signals associated with the first RAT and synchronize with the base station using the synchronization signals. In some cases, the synchronization signals include PSSs and SSSs. RMSI manager 1035 may determine a location of a data channel including RMSI for the UE communications manager 1015 based on the control channel. In some cases, RMSI manager 1035 may identify a location of a coreset including control information for the UE communications manager 1015 based on one or more bits in the control channel, and RMSI manager 1035 may determine the location of the data channel including the RMSI for the UE communications manager 1015 based on the control information in the coreset. In some cases, the one or more bits comprise reserved bits in the control channel.

Figure 11:
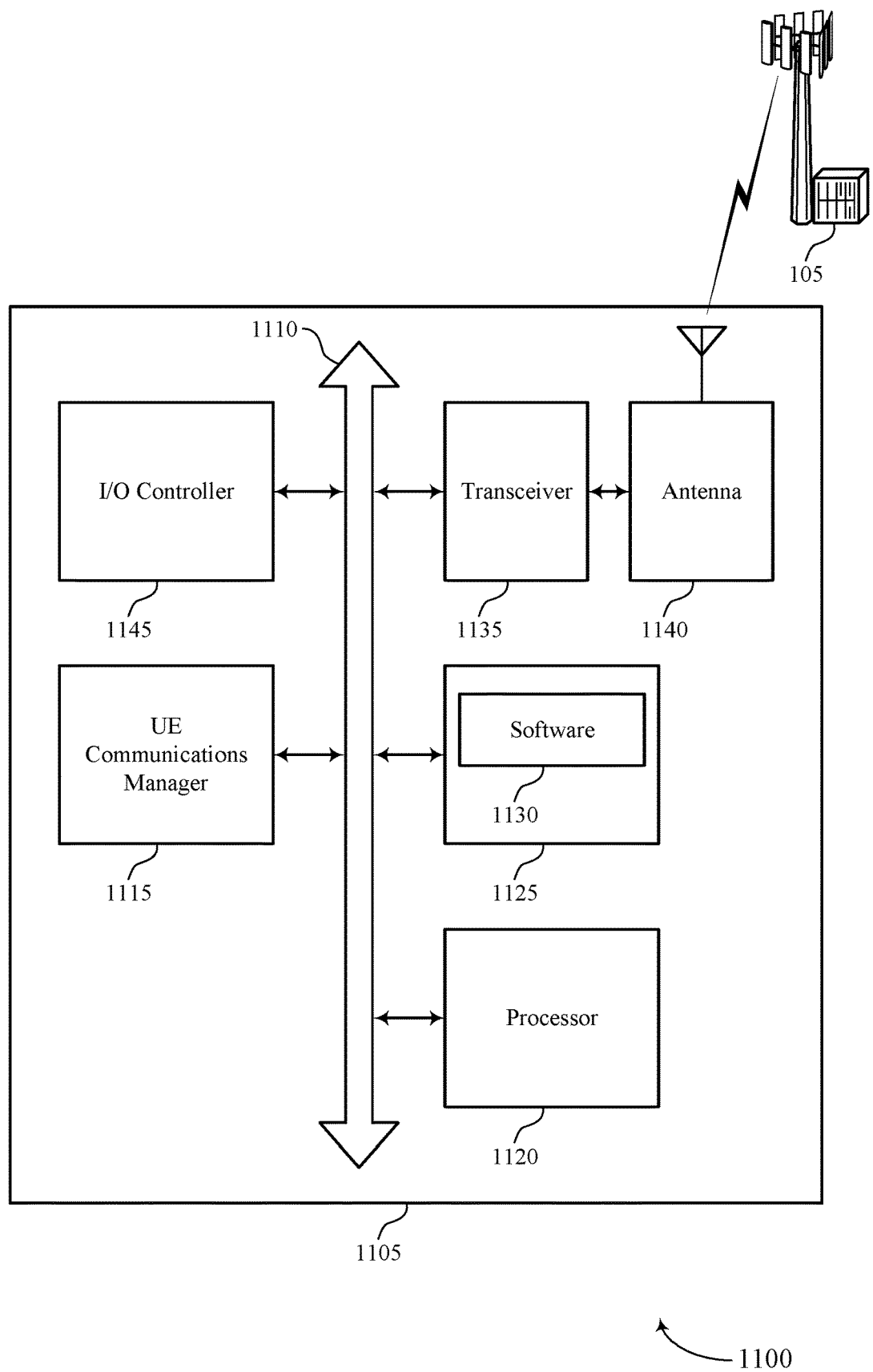
FIG. 11 illustrates a block diagram of a system including a user equipment (UE) that supports carrier sharing between multiple RATs in accordance with various aspects of the present disclosure.

FIG. 11 shows a diagram of a system 1100 including a device 1105 that supports carrier sharing between multiple RATs in accordance with various aspects of the present disclosure. Device 1105 may be an example of or include the components of wireless device 805, wireless device 905, or a UE 115 as described herein, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting carrier sharing between multiple RATs).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support carrier sharing between multiple RATs. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described herein. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
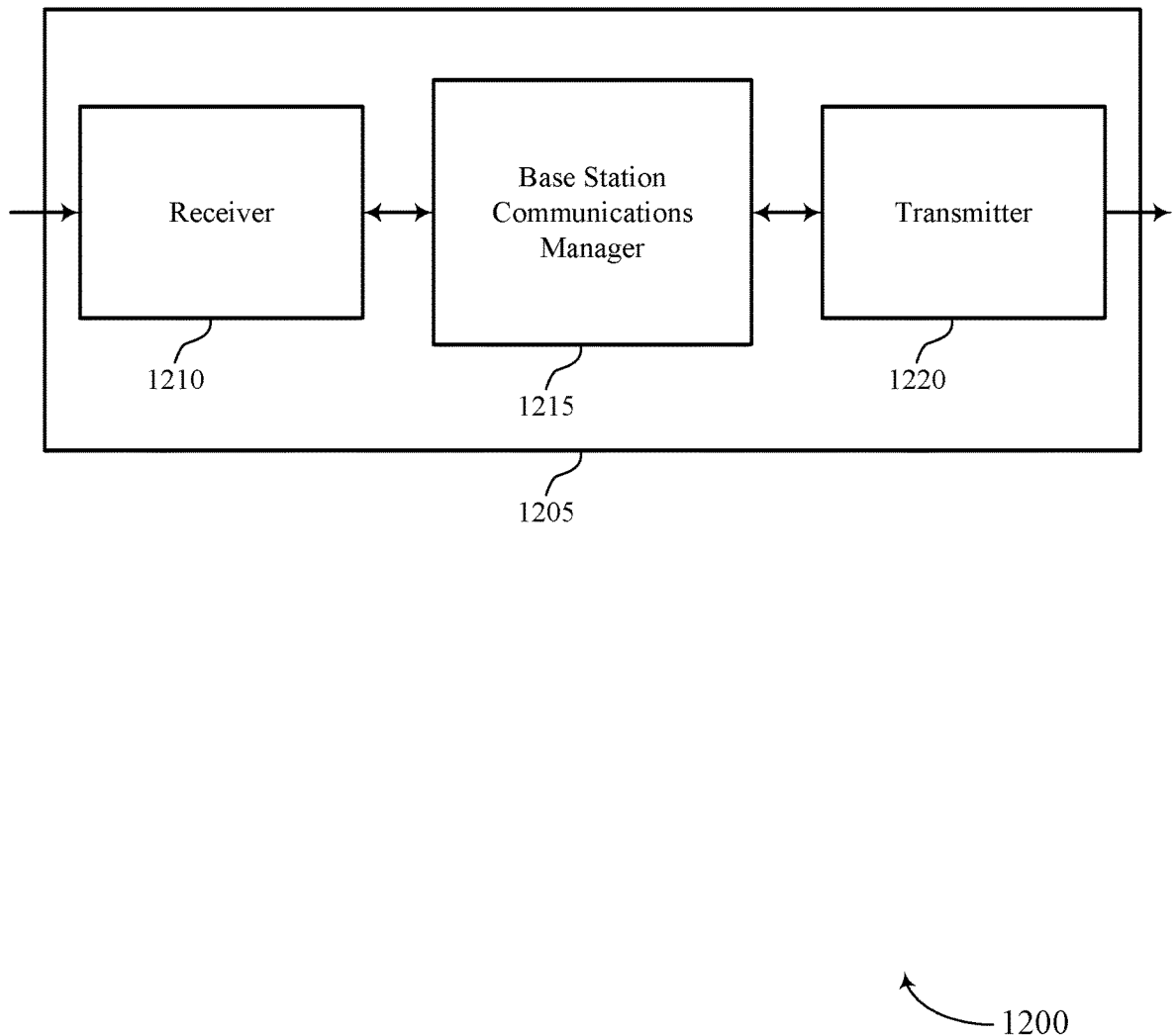
FIGS. 12-14 show block diagrams of a device that supports carrier sharing between multiple RATs in accordance with various aspects of the present disclosure.

FIG. 12 shows a block diagram 1200 of a wireless device 1205 that supports carrier sharing between multiple RATs in accordance with various aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to carrier sharing between multiple RATs, etc.). Information may be passed on to other components of the device. The receiver 1210 may be an example of aspects of the transceiver 1535 described with reference to FIG. 15. The receiver 1210 may utilize a single antenna or a set of antennas.

Base station communications manager 1215 may be an example of aspects of the base station communications manager 1515 described with reference to FIG. 15. Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1215 may identify a carrier that supports communications using a first RAT and a second RAT and transmit, to one or more UEs, a control channel associated with the first RAT that indicates that the carrier supports communications using the second RAT. Base station communications manager 1215 may then coordinate with receiver 1210 and transmitter 1220 to communicate with the one or more UEs using the second RAT on resources of the carrier based on the indication in the control channel that the carrier supports communications using the second RAT.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
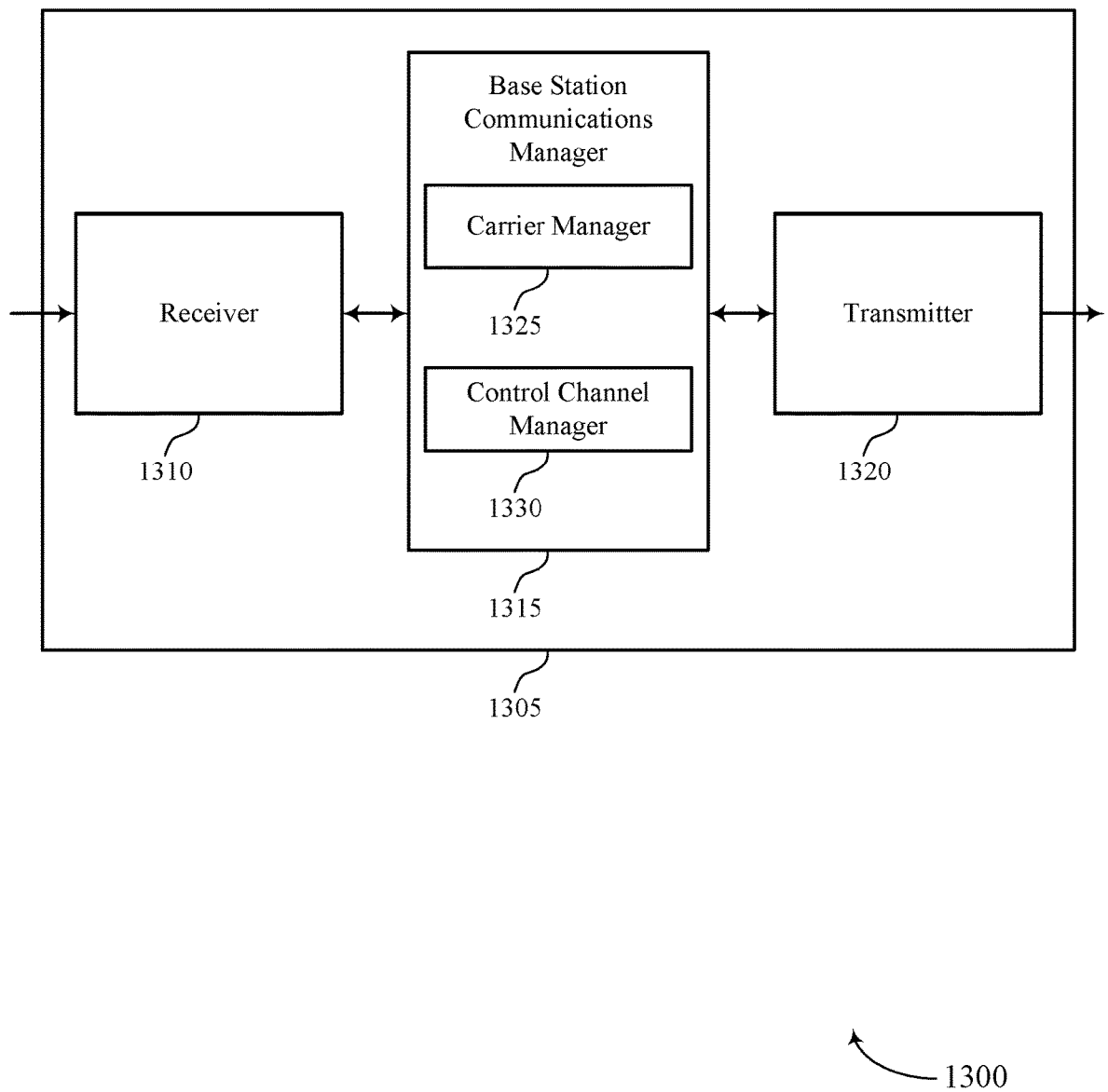

FIG. 13 shows a block diagram 1300 of a wireless device 1305 that supports carrier sharing between multiple RATs in accordance with various aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to carrier sharing between multiple RATs, etc.). Information may be passed on to other components of the device. The receiver 1310 may be an example of aspects of the transceiver 1535 described with reference to FIG. 15. The receiver 1310 may utilize a single antenna or a set of antennas.

Base station communications manager 1315 may be an example of aspects of the base station communications manager 1515 described with reference to FIG. 15. Base station communications manager 1315 may include carrier manager 1325 and control channel manager 1330.

Carrier manager 1325 may identify a carrier that supports communications using a first RAT and a second RAT. In some cases, identifying that the carrier supports communications using the first RAT and the second RAT includes identifying that the control channel is in a frequency band in which the first RAT and the second RAT coexist. In some cases, the first RAT is associated with communications during TTIs having a first duration, and the second RAT is associated with communications during TTIs having a second duration. In some cases, the first RAT is associated with an LTE network and the second RAT is associated with an NR network.

Control channel manager 1330 may transmit, to one or more UEs, a control channel associated with the first RAT that indicates that the carrier supports communications using the second RAT. In some cases, the indication in the control channel that the carrier supports communications using the second RAT is included in one or more bits in the control channel. In some cases, the control channel is a PBCH. In some cases, the one or more bits comprise reserved bits in the control channel.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
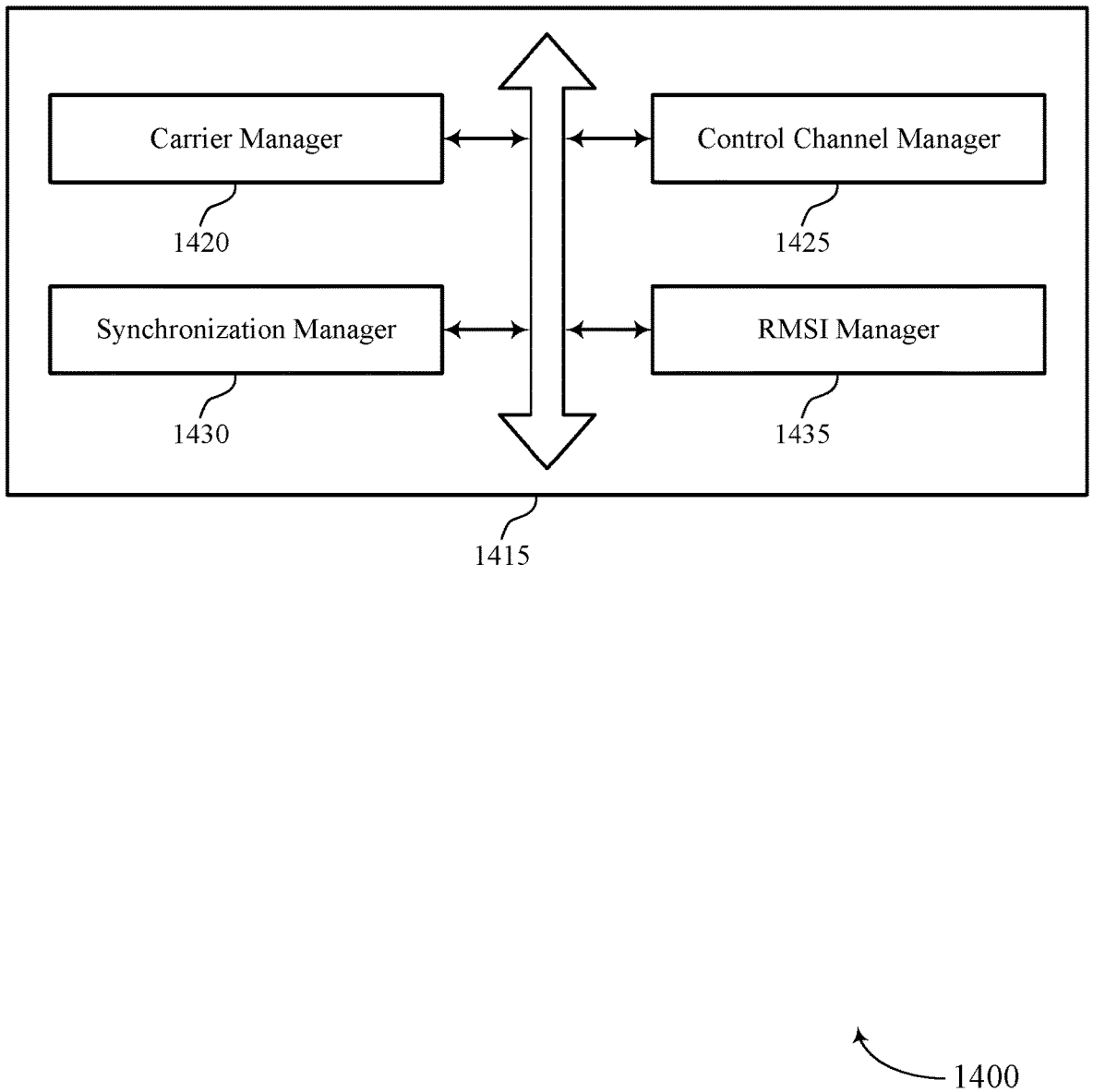

FIG. 14 shows a block diagram 1400 of a base station communications manager 1415 that supports carrier sharing between multiple RATs in accordance with various aspects of the present disclosure. The base station communications manager 1415 may be an example of aspects of a base station communications manager 1515 described with reference to FIGS. 12, 13, and 15. The base station communications manager 1415 may include carrier manager 1420, control channel manager 1425, synchronization manager 1430, and RMSI manager 1435. Each of these modules may communicate, directly or indirectly, with one another (e.g., via one or more buses).

Carrier manager 1420 may identify a carrier that supports communications using a first RAT and a second RAT. In some cases, identifying that the carrier supports communications using the first RAT and the second RAT includes identifying that the control channel is in a frequency band in which the first RAT and the second RAT coexist. In some cases, the first RAT is associated with communications during TTIs having a first duration, and the second RAT is associated with communications during TTIs having a second duration. In some cases, the first RAT is associated with an LTE network and the second RAT is associated with an NR network. Control channel manager 1425 may transmit, to one or more UEs, a control channel associated with the first RAT that indicates that the carrier supports communications using the second RAT. In some cases, the indication in the control channel that the carrier supports communications using the second RAT is included in one or more bits in the control channel. In some cases, the control channel is a PBCH. In some cases, the one or more bits comprise reserved bits in the control channel.

Synchronization manager 1430 may transmit, to the one or more UEs, synchronization signals associated with the first RAT, where the synchronization signals include information for synchronizing with the base station. In some cases, the synchronization signals include PSSs and SSSs. RMSI manager 1435 may transmit, in the control channel, an indication of a location of a data channel including RMSI for the one or more UEs. In some cases, transmitting the indication of the location of the data channel includes transmitting one or more bits in the control channel that indicate a location of a coreset including control information for the one or more UEs, where the control information indicates the location of the data channel including the RMSI for the one or more UEs. In some cases, the one or more bits comprise reserved bits in the control channel.

Figure 15:
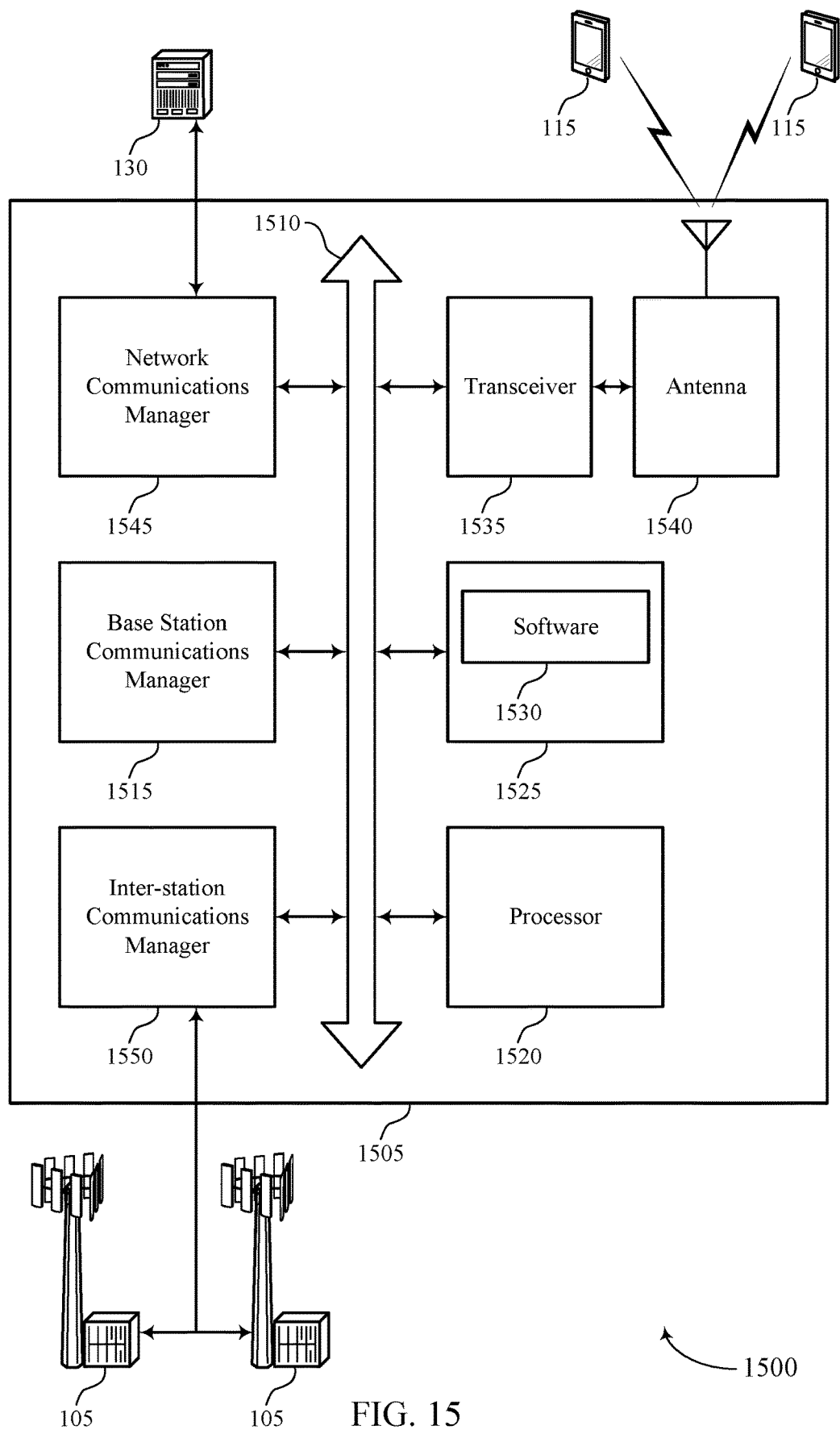
FIG. 15 illustrates a block diagram of a system including a base station that supports carrier sharing between multiple RATs in accordance with various aspects of the present disclosure.

FIG. 15 shows a diagram of a system 1500 including a device 1505 that supports carrier sharing between multiple RATs in accordance with various aspects of the present disclosure. Device 1505 may be an example of or include the components of base station 105 as described herein, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting carrier sharing between multiple RATs).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support carrier sharing between multiple RATs. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described herein. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105 and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an LTE/LTE-A wireless communication network technology to provide communication between base stations 105.

Figure 16:
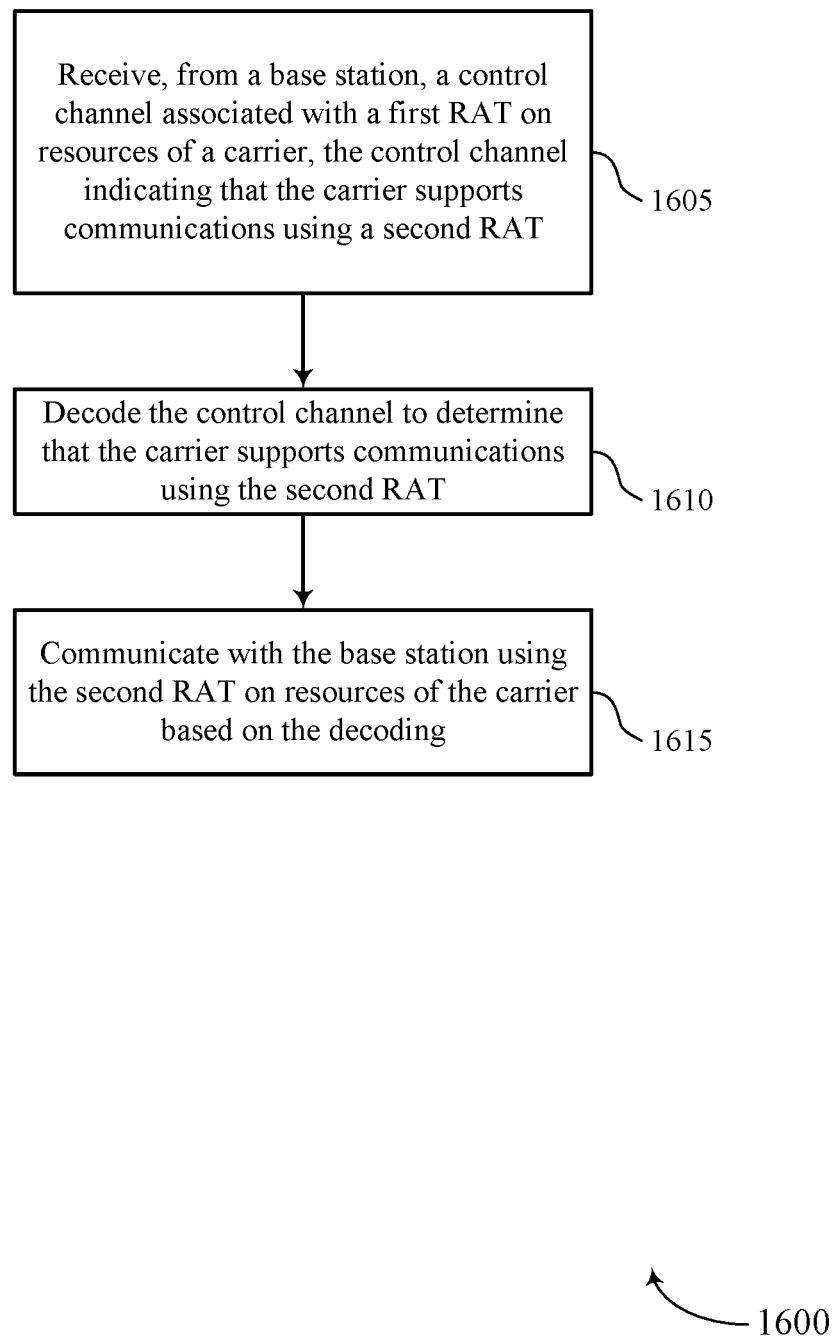
FIGS. 16-19 illustrate methods for carrier sharing between multiple RATs in accordance with various aspects of the present disclosure.

FIG. 16 shows a flowchart illustrating a method 1600 for carrier sharing between multiple RATs in accordance with various aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described herein. Additionally or alternatively, the UE 115 may perform aspects of the functions described herein using special-purpose hardware.

At 1605 the UE 115 may receive, from a base station, a control channel associated with a first RAT on resources of a carrier, where the control channel indicates that the carrier supports communications using a second RAT. The operations of 1605 may be performed according to the methods described herein. In certain examples, aspects of the operations of 1605 may be performed by a control channel manager as described with reference to FIGS. 8 through 11.

At 1610 the UE 115 may decode the control channel to determine that the carrier supports communications using the second RAT. The operations of 1610 may be performed according to the methods described herein. In certain examples, aspects of the operations of 1610 may be performed by a decoder as described with reference to FIGS. 8 through 11.

At 1615 the UE 115 may communicate with the base station using the second RAT on resources of the carrier based at least in part on the decoding. The operations of 1615 may be performed according to the methods described herein. In certain examples, aspects of the operations of 1615 may be performed by a transmitter as described with reference to FIGS. 8 through 11.

Figure 17:
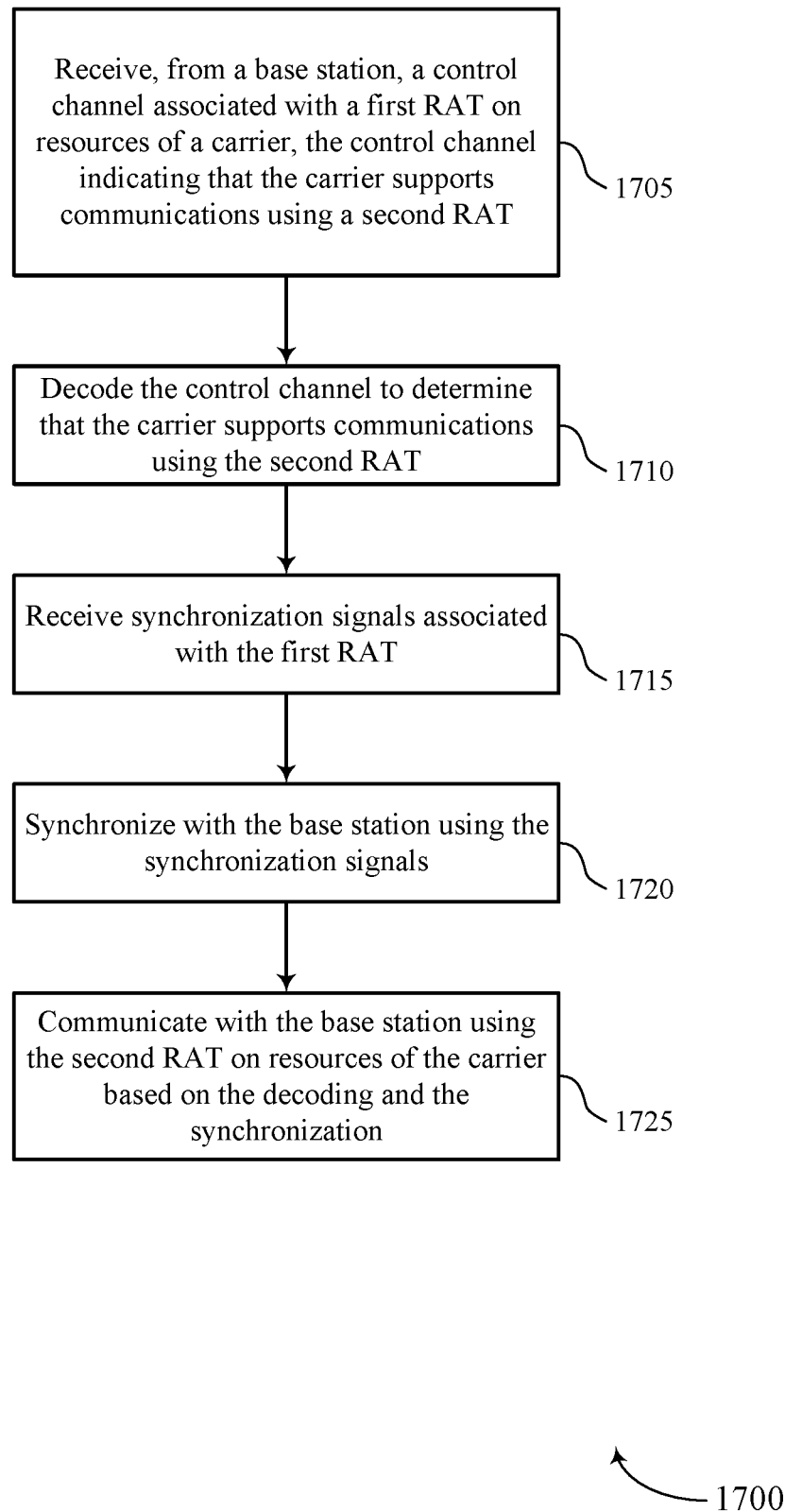

FIG. 17 shows a flowchart illustrating a method 1700 for carrier sharing between multiple RATs in accordance with various aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE 115 may execute a set of codes to control the functional elements of the device to perform the functions described herein. Additionally or alternatively, the UE 115 may perform aspects of the functions described herein using special-purpose hardware.

At 1705 the UE 115 may receive, from a base station, a control channel associated with a first RAT on resources of a carrier, the control channel indicating that the carrier supports communications using a second RAT. The operations of 1705 may be performed according to the methods described herein. In certain examples, aspects of the operations of 1705 may be performed by a control channel manager as described with reference to FIGS. 8 through 11.

At 1710 the UE 115 may decode the control channel to determine that the carrier supports communications using the second RAT. The operations of 1710 may be performed according to the methods described herein. In certain examples, aspects of the operations of 1710 may be performed by a decoder as described with reference to FIGS. 8 through 11.

At 1715 the UE 115 may receive synchronization signals associated with the first RAT. The operations of 1715 may be performed according to the methods described herein. In certain examples, aspects of the operations of 1715 may be performed by a synchronization manager as described with reference to FIGS. 8 through 11.

At 1720 the UE 115 may synchronize with the base station using the synchronization signals (e.g., based on determining that the carrier supports communications using the second RAT). The operations of 1720 may be performed according to the methods described herein. In certain examples, aspects of the operations of 1720 may be performed by a synchronization manager as described with reference to FIGS. 8 through 11.

At 1725 the UE 115 may communicate with the base station using the second RAT on resources of the carrier based at least in part on the decoding and the synchronization. The operations of 1725 may be performed according to the methods described herein. In certain examples, aspects of the operations of 1725 may be performed by a transmitter as described with reference to FIGS. 8 through 11.

Figure 18:
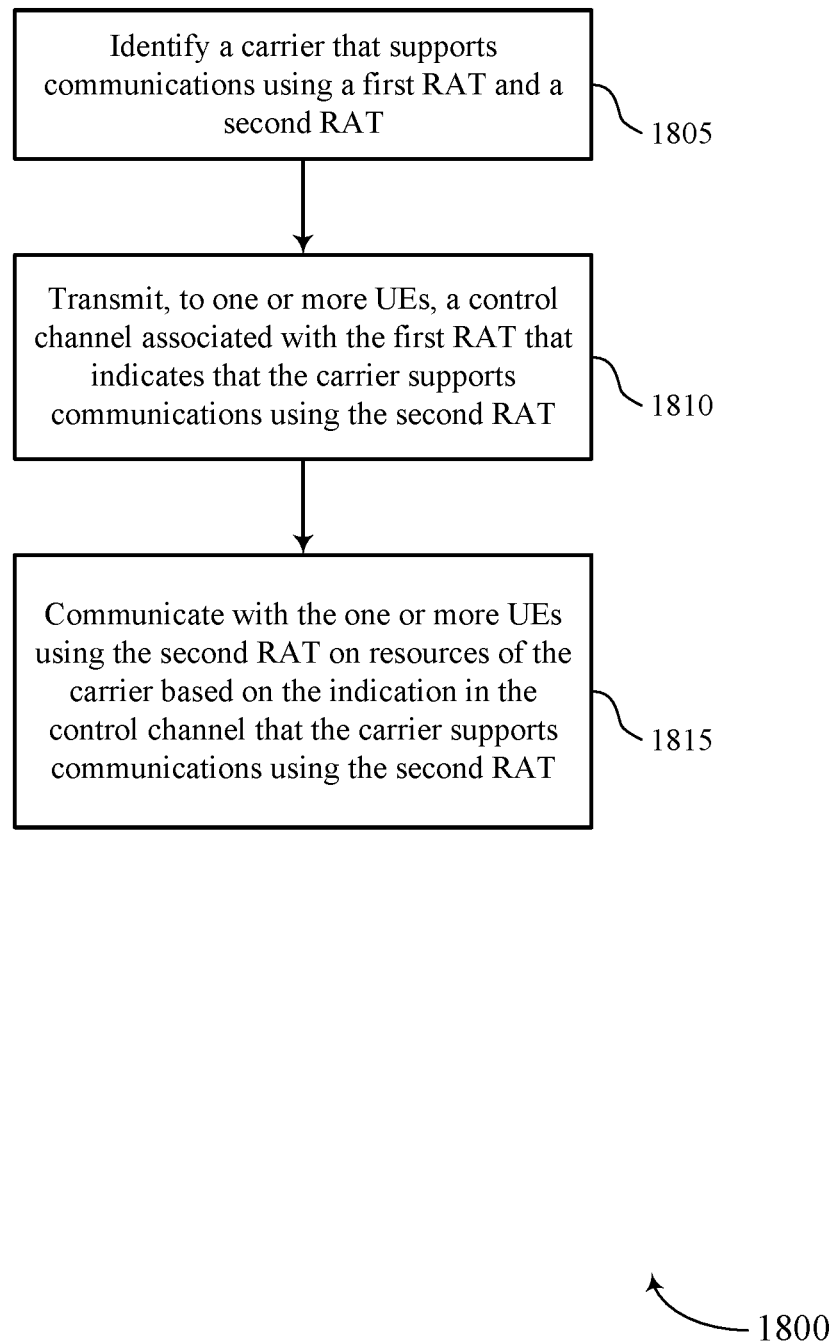

FIG. 18 shows a flowchart illustrating a method 1800 for carrier sharing between multiple RATs in accordance with various aspects of the present disclosure. The operations of method 1800 may be implemented by a base station 105 or its components as described herein. For example, the operations of method 1800 may be performed by a base station communications manager as described with reference to FIGS. 12 through 15. In some examples, a base station 105 may execute a set of codes to control the functional elements of the device to perform the functions described herein. Additionally or alternatively, the base station 105 may perform aspects of the functions described herein using special-purpose hardware.

At 1805 the base station 105 may identify a carrier that supports communications using a first RAT and a second RAT. The operations of 1805 may be performed according to the methods described herein. In certain examples, aspects of the operations of 1805 may be performed by a carrier manager as described with reference to FIGS. 12 through 15.

At 1810 the base station 105 may transmit, to one or more UEs, a control channel associated with the first RAT that indicates that the carrier supports communications using the second RAT. The operations of 1810 may be performed according to the methods described herein. In certain examples, aspects of the operations of 1810 may be performed by a control channel manager as described with reference to FIGS. 12 through 15.

At 1815 the base station 105 may communicate with the one or more UEs using the second RAT on resources of the carrier based at least in part on the indication in the control channel that the carrier supports communications using the second RAT. The operations of 1815 may be performed according to the methods described herein. In certain examples, aspects of the operations of 1815 may be performed by a transmitter as described with reference to FIGS. 12 through 15.

Figure 19:
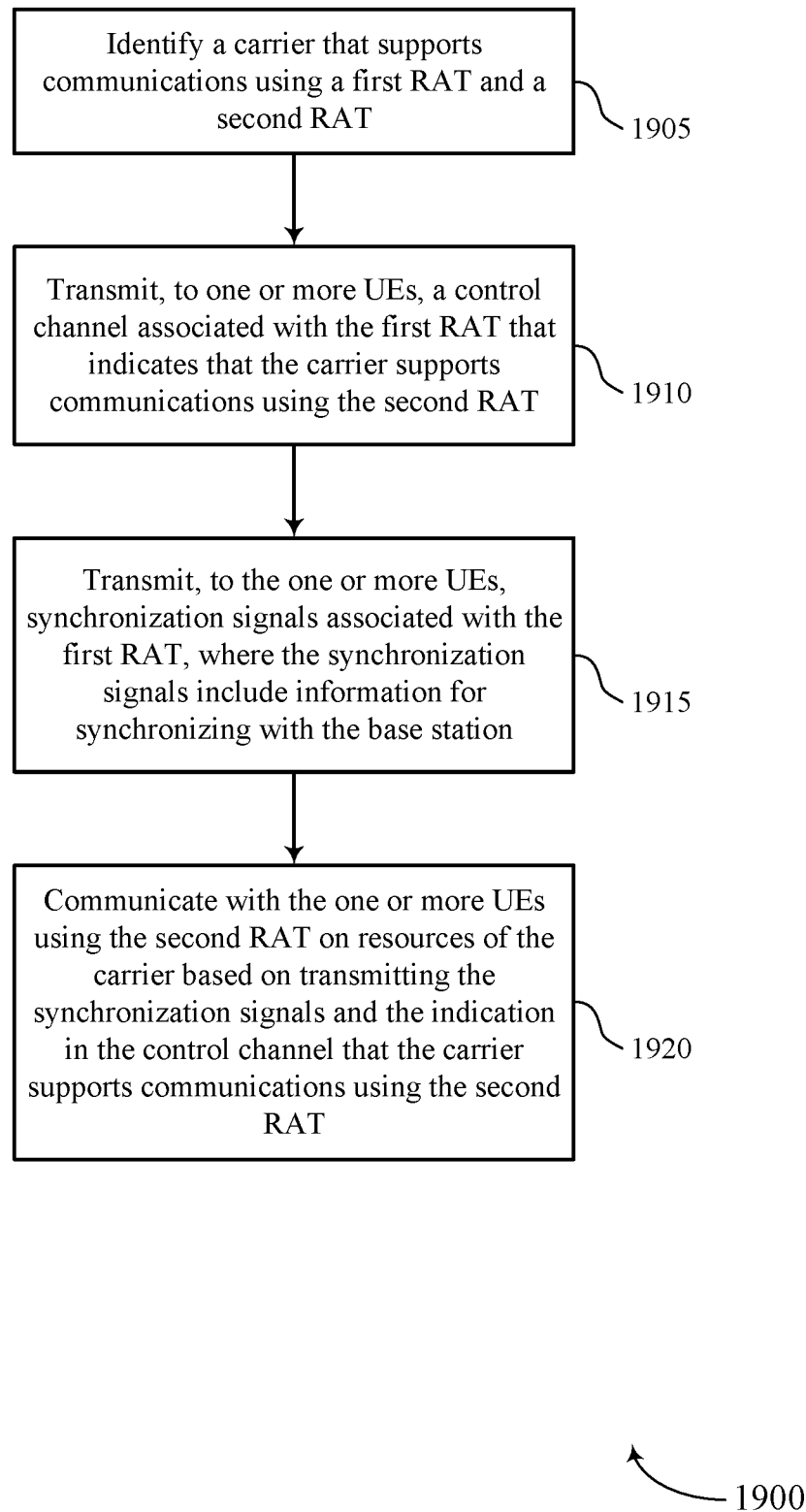

FIG. 19 shows a flowchart illustrating a method 1900 for carrier sharing between multiple RATs in accordance with various aspects of the present disclosure. The operations of method 1900 may be implemented by a base station 105 or its components as described herein. For example, the operations of method 1900 may be performed by a base station communications manager as described with reference to FIGS. 12 through 15. In some examples, a base station 105 may execute a set of codes to control the functional elements of the device to perform the functions described herein. Additionally or alternatively, the base station 105 may perform aspects of the functions described below using special-purpose hardware.

At 1905 the base station 105 may identify a carrier that supports communications using a first RAT and a second RAT. The operations of 1905 may be performed according to the methods described herein. In certain examples, aspects of the operations of 1905 may be performed by a carrier manager as described with reference to FIGS. 12 through 15.

At 1910 the base station 105 may transmit, to one or more UEs, a control channel associated with the first RAT that indicates that the carrier supports communications using the second RAT. The operations of 1910 may be performed according to the methods described herein. In certain examples, aspects of the operations of 1910 may be performed by a control channel manager as described with reference to FIGS. 12 through 15.

At 1915 the base station 105 may transmit, to the one or more UEs, synchronization signals associated with the first RAT, wherein the synchronization signals comprise information for synchronizing with the base station. The operations of 1915 may be performed according to the methods described herein. In certain examples, aspects of the operations of 1915 may be performed by a synchronization manager as described with reference to FIGS. 12 through 15.

At 1920 the base station 105 may communicate with the one or more UEs using the second RAT on resources of the carrier based at least in part on transmitting the synchronization signals and the indication in the control channel that the carrier supports communications using the second RAT. The operations of 1920 may be performed according to the methods described herein. In certain examples, aspects of the operations of 1920 may be performed by a transmitter as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The term "carrier" refers to a set of radio frequency spectrum resources having a defined physical layer structure for supporting communications over a communication link. For example, a carrier of a communication link may include a portion of a radio frequency spectrum band that is operated according to physical layer channels for a given RAT. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving, from a base station, a control channel associated with a first radio access technology (RAT) on resources of a carrier, the control channel indicating that the carrier supports communications using a second RAT;
    decoding the control channel to determine that the carrier supports communications using the second RAT by identifying a carrier capability indicator in the control channel comprising one or more bits that indicate that the carrier supports communications using the second RAT; and
    communicating with the base station using the second RAT on resources of the carrier based at least in part on the decoding.

2. The method of claim 1, wherein the one or more bits comprise reserved bits in the control channel.

3. The method of claim 1, wherein the control channel is a physical broadcast control channel (PBCH).

4. The method of claim 1, further comprising:
    receiving synchronization signals associated with the first RAT; and
    synchronizing with the base station using the synchronization signals.

5. The method of claim 4, wherein the communicating with the base station using the second RAT on resources of the carrier is further based at least in part on the synchronizing.

6. The method of claim 4, wherein the synchronization signals comprise primary synchronization signals (PSSs) and secondary synchronization signals (SSSs).

7. The method of claim 1, further comprising:
    determining a location of a data channel comprising remaining minimum system information (RMSI) for the UE based at least in part on the control channel.

8. The method of claim 7, wherein determining the location of the data channel comprises:
    identifying a location of a control resource set (coreset) comprising control information for the UE based at least in part on one or more bits in the control channel; and
    determining the location of the data channel comprising the RMSI for the UE based at least in part on the control information in the coreset.

9. The method of claim 8, wherein the one or more bits comprise reserved bits in the control channel.

10. The method of claim 1, wherein the first RAT is associated with communications during transmission time intervals (TTIs) having a first duration, and the second RAT is associated with communications during TTIs having a second duration.

11. The method of claim 1, wherein the first RAT is associated with a Long Term Evolution (LTE) network and the second RAT is associated with a New Radio (NR) network.

12. A method for wireless communication at a base station, comprising:
   identifying a carrier that supports communications using a first radio access technology (RAT) and a second RAT;
   transmitting, to one or more UEs, a control channel associated with the first RAT that includes a carrier capability indicator comprising one or more bits that indicate that the carrier supports communications using the second RAT; and
   communicating with the one or more UEs using the second RAT on resources of the carrier based at least in part on the carrier capability indicator in the control channel that indicates that the carrier supports communications using the second RAT.

13. The method of claim 12, wherein identifying that the carrier supports communications using the first RAT and the second RAT comprises:
   identifying that the control channel is in a frequency band in which the first RAT and the second RAT coexist.

14. The method of claim 12, wherein the one or more bits comprise reserved bits in the control channel.

15. The method of claim 12, wherein the control channel is a physical broadcast control channel (PBCH).

16. The method of claim 12, further comprising:
   transmitting, to the one or more UEs, synchronization signals associated with the first RAT, wherein the synchronization signals comprise information for synchronizing with the base station.

17. The method of claim 16, wherein the synchronization signals comprise primary synchronization signals (PSSs) and secondary synchronization signals (SSSs).

18. The method of claim 12, further comprising:
   transmitting, in the control channel, an indication of a location of a data channel comprising remaining minimum system information (RMSI) for the one or more UEs.

19. The method of claim 18, wherein transmitting the indication of the location of the data channel comprises:
   transmitting one or more bits in the control channel that indicate a location of a control resource set (coreset) comprising control information for the one or more UEs, wherein the control information indicates the location of the data channel comprising the RMSI for the one or more UEs.

20. The method of claim 19, wherein the one or more bits comprise reserved bits in the control channel.

21. The method of claim 12, wherein the first RAT is associated with communications during transmission time intervals (TTIs) having a first duration, and the second RAT is associated with communications during TTIs having a second duration.

22. The method of claim 12, wherein the first RAT is associated with a Long Term Evolution (LTE) network and the second RAT is associated with a New Radio (NR) network.

23. An apparatus for wireless communication at a user equipment (UE), comprising:
   a processor;
   memory in electronic communication with the processor; and
   instructions stored in the memory and executable by the processor to cause the apparatus to:
      receive, from a base station, a control channel associated with a first radio access technology (RAT) on resources of a carrier, the control channel indicating that the carrier supports communications using a second RAT;
      decode the control channel to determine that the carrier supports communications using the second RAT by identifying a carrier capability indicator in the control channel comprising one or more bits that indicate that the carrier supports communications using the second RAT; and
      communicate with the base station using the second RAT on resources of the carrier based at least in part on the decoding.

24. The apparatus of claim 23, wherein the one or more bits comprise reserved bits in the control channel.

25. An apparatus for wireless communication at a base station, comprising:
   a processor;
   memory in electronic communication with the processor; and
   instructions stored in the memory and executable by the processor to cause the apparatus to:
      identify a carrier that supports communications using a first radio access technology (RAT) and a second RAT;
      transmit, to one or more UEs, a control channel associated with the first RAT that a carrier capability indicator comprising one or more bits that indicate that the carrier supports communications using the second RAT; and
      communicate with the one or more UEs using the second RAT on resources of the carrier based at least in part on the carrier capability indicator in the control channel that indicates that the carrier supports communications using the second RAT.

26. The apparatus of claim 25, wherein the instructions to identify that the carrier supports communications using the first RAT and the second RAT are executable by the processor to cause the apparatus to:
   identify that the control channel is in a frequency band in which the first RAT and the second RAT coexist.

* * * * *